(12) United States Patent
Kim et al.

(10) Patent No.: US 12,091,477 B2
(45) Date of Patent: Sep. 17, 2024

(54) ETHYLENE/1-HEXENE COPOLYMER HAVING EXCELLENT LONG-TERM PHYSICAL PROPERTIES AND PROCESSABILITY

(71) Applicant: LG Chem, Ltd., Seoul (KR)

(72) Inventors: Joongsoo Kim, Daejeon (KR); Changsub Kim, Daejeon (KR); Jinyoung Kwak, Daejeon (KR); Jaeyoung Cho, Daejeon (KR); Bog Ki Hong, Daejeon (KR); Daesik Hong, Daejeon (KR)

(73) Assignee: LG Chem, Ltd., Seoul (KR)

( * ) Notice: Subject to any disclaimer, the term of this patent is extended or adjusted under 35 U.S.C. 154(b) by 608 days.

(21) Appl. No.: 17/311,794

(22) PCT Filed: Sep. 28, 2020

(86) PCT No.: PCT/KR2020/013174
§ 371 (c)(1),
(2) Date: Jun. 8, 2021

(87) PCT Pub. No.: WO2021/066437
PCT Pub. Date: Apr. 8, 2021

(65) Prior Publication Data
US 2022/0017667 A1    Jan. 20, 2022

(30) Foreign Application Priority Data

Sep. 30, 2019 (KR) .................. 10-2019-0121175
Sep. 25, 2020 (KR) .................. 10-2020-0125236

(51) Int. Cl.
  C08F 210/16    (2006.01)
  C08F 210/02    (2006.01)
  F16L 9/12      (2006.01)
  C08F 4/6592    (2006.01)

(52) U.S. Cl.
  CPC .......... C08F 210/02 (2013.01); C08F 210/16 (2013.01); F16L 9/12 (2013.01); C08F 4/6592 (2013.01); C08F 2800/20 (2013.01)

(58) Field of Classification Search
  CPC .............. C08F 210/16; C08F 210/02
  See application file for complete search history.

(56) References Cited

U.S. PATENT DOCUMENTS

| | | | |
|---|---|---|---|
| 4,935,474 A | 6/1990 | Ewen et al. | |
| 6,180,736 B1 | 1/2001 | Muhle et al. | |
| 6,221,982 B1 | 4/2001 | Debras et al. | |
| 6,841,631 B2 | 1/2005 | Loveday et al. | |
| 6,894,128 B2 | 5/2005 | Loveday et al. | |
| 6,911,508 B2 | 6/2005 | McCullough | |
| 9,290,593 B2 * | 3/2016 | Cho | C08F 210/08 |
| 10,253,122 B2 | 4/2019 | Sung et al. | |
| 11,332,553 B2 * | 5/2022 | Kim | C08F 4/65916 |
| 2007/0037937 A1 | 2/2007 | Damme | |
| 2007/0043176 A1 | 2/2007 | Martin et al. | |
| 2010/0121006 A1 | 5/2010 | Cho et al. | |
| 2013/0225834 A1 | 8/2013 | Shin et al. | |
| 2016/0280822 A1 | 9/2016 | Kim et al. | |
| 2016/0369020 A1 | 12/2016 | Sung et al. | |
| 2017/0145122 A1 | 5/2017 | Kim et al. | |
| 2018/0223009 A1 * | 8/2018 | Kim | B01J 27/24 |
| 2018/0305481 A1 | 10/2018 | Yu et al. | |
| 2021/0032449 A1 * | 2/2021 | Park | C08F 4/659 |
| 2022/0403074 A1 * | 12/2022 | Kim | C08F 2/01 |

FOREIGN PATENT DOCUMENTS

| | | | | |
|---|---|---|---|---|
| CN | 1922219 A | 2/2007 | | |
| CN | 105814101 A | 7/2016 | | |
| CN | 108350113 A | 7/2018 | | |
| EP | 3369752 A1 | 9/2018 | | |
| EP | 3640269 A1 | 4/2020 | | |
| JP | H11189605 A | 7/1999 | | |
| JP | 2008024758 A | 2/2008 | | |
| JP | 2009504901 A | 2/2009 | | |
| JP | 2017526773 A | 9/2017 | | |
| JP | 2017530201 A | 10/2017 | | |
| KR | 20070004694 A | 1/2007 | | |
| KR | 20080097949 A | 11/2008 | | |
| KR | 10-2012-0038798 A * | 4/2012 | ............. | C08F 10/02 |
| KR | 101212637 B1 | 12/2012 | | |
| KR | 20130046408 A | 5/2013 | | |
| KR | 20130046408 A * | 5/2013 | ............ | C08F 210/16 |
| KR | 20160057291 A | 5/2016 | | |
| KR | 20170105407 A | 9/2017 | | |
| KR | 20170106110 A | 9/2017 | | |
| KR | 20180063669 A | 6/2018 | | |
| KR | 20190074963 A | 6/2019 | | |

(Continued)

OTHER PUBLICATIONS

Extended European Search Report for EP Application No. 20870553 dated Jan. 5, 2022, 3 pgs.
Alexakis, A. et al., "Mild Protection and Deprotection of Alcohols as Ter-Butyl Ethers in The Field of Pheromone Synthesis" Tetrahedron Letters, Feb. 1988, pp. 2951-2954, vol. 29, Britain.
Fleissner, M. "Langsames Risswachstum und Zeitstandfestigkeit von Rohren aus Polyethylen", Kunststoffe, 1987, pp. 45-50, vol. 77, Hanser, München, Germany.
International Search Report for Application No. PCT/KR2020/013174 mailed Jan. 6, 2021, pp. 1-4.

*Primary Examiner* — Rip A Lee

(74) *Attorney, Agent, or Firm* — Lerner David LLP

(57) ABSTRACT

Provided is an ethylene/1-hexene copolymer which has excellent long-term physical properties and processability, and thus may be usefully applied to manufacturing high-pressure resistant heating pipes, PE-RT pipes, large-diameter pipes, or the like.

17 Claims, 9 Drawing Sheets

(56) References Cited

FOREIGN PATENT DOCUMENTS

WO     2016036204 A1    3/2016
WO     2019124835 A1    6/2019

* cited by examiner

[FIG. 1]
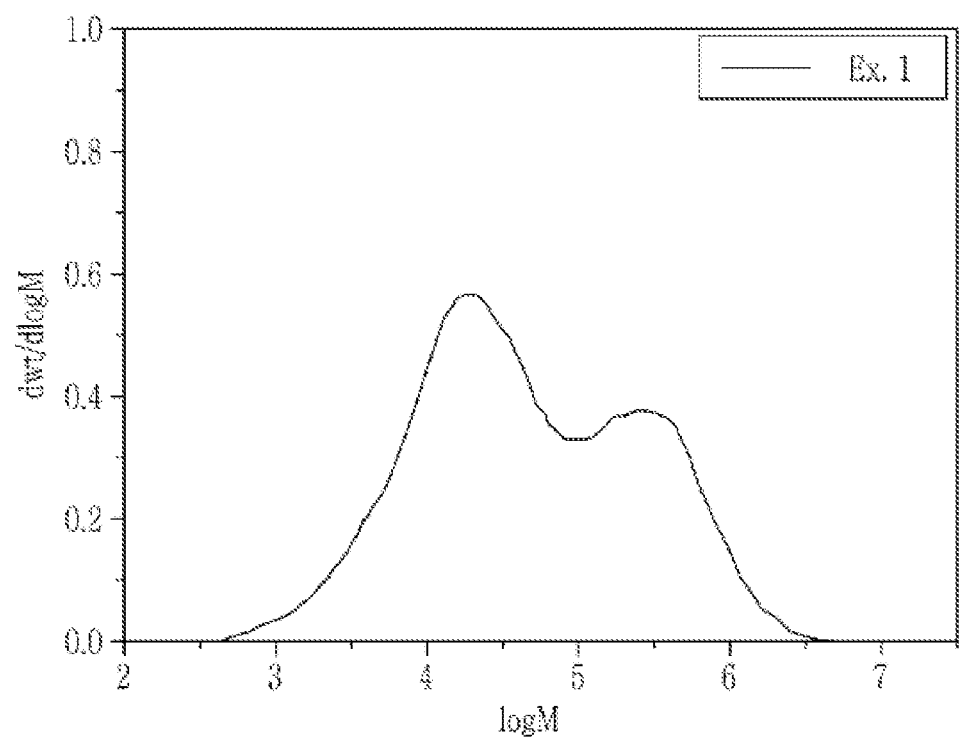

[FIG. 2]
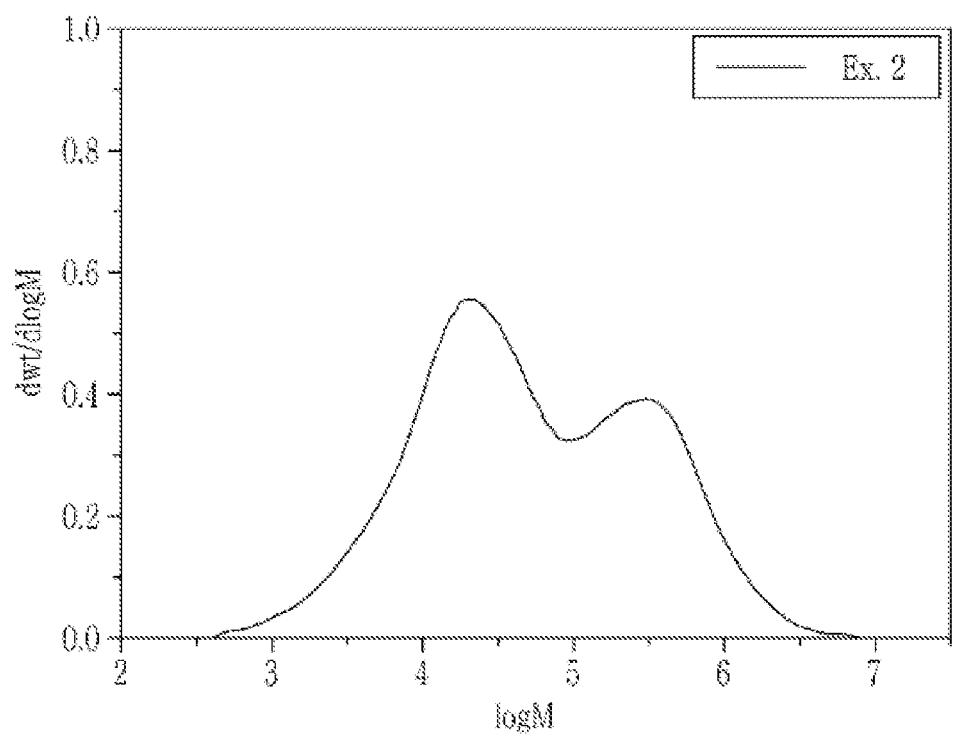

[FIG. 3]
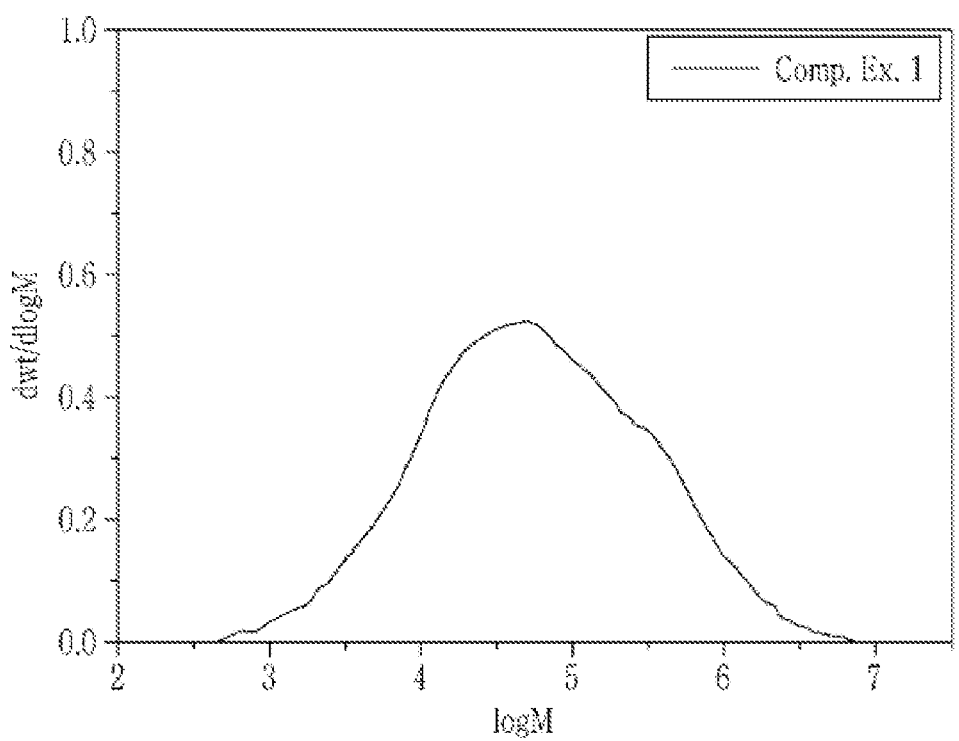

[FIG. 4]
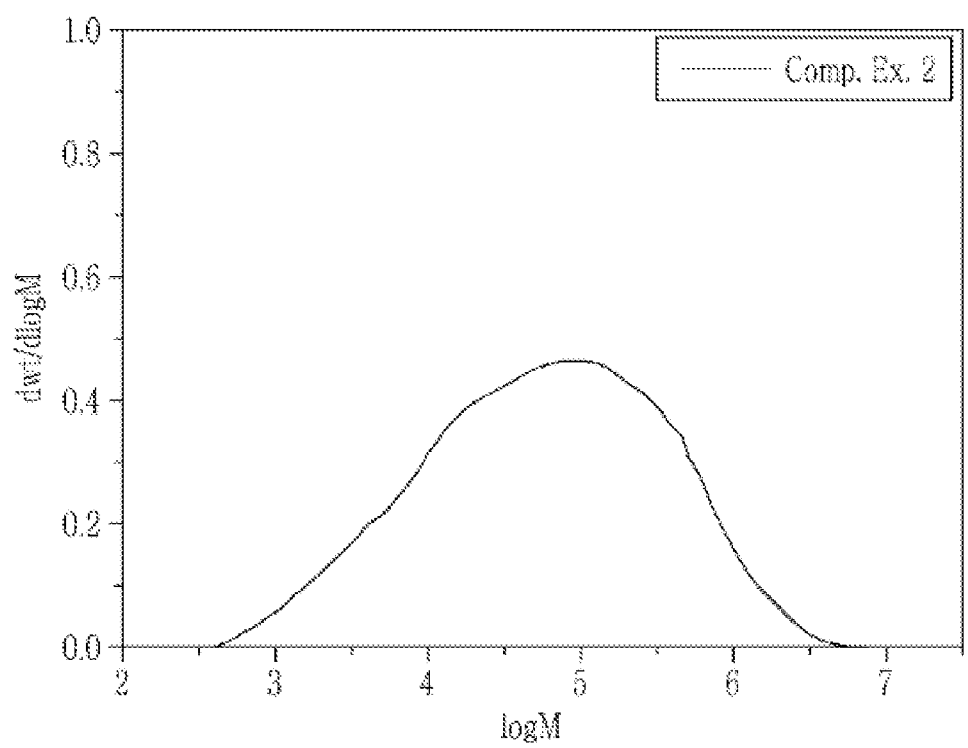

[FIG. 5]
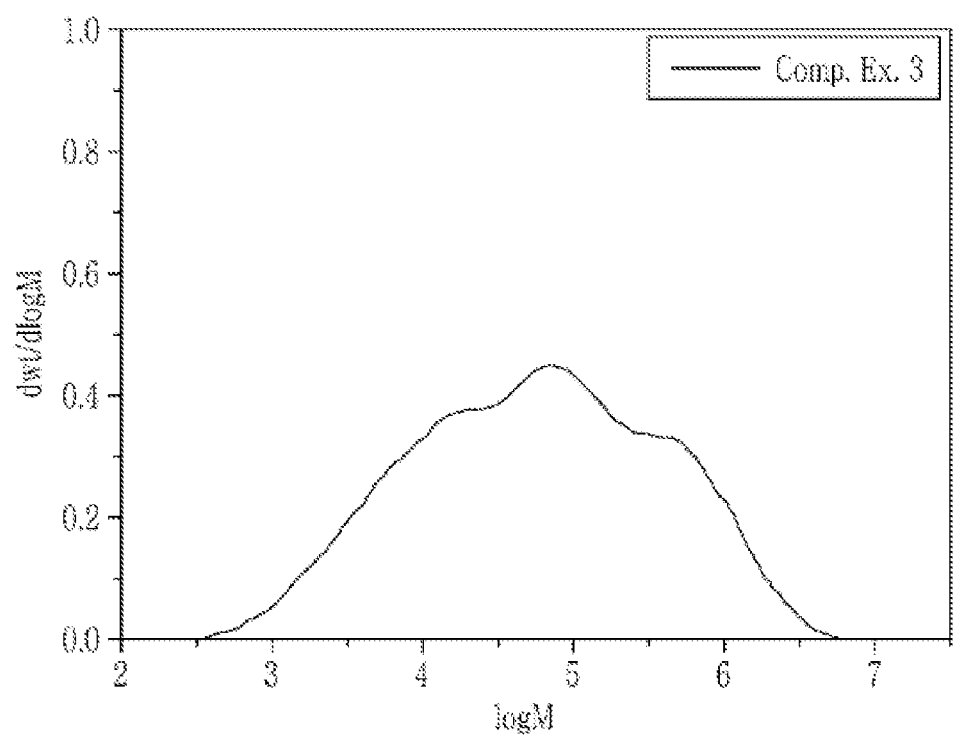

[FIG. 6]
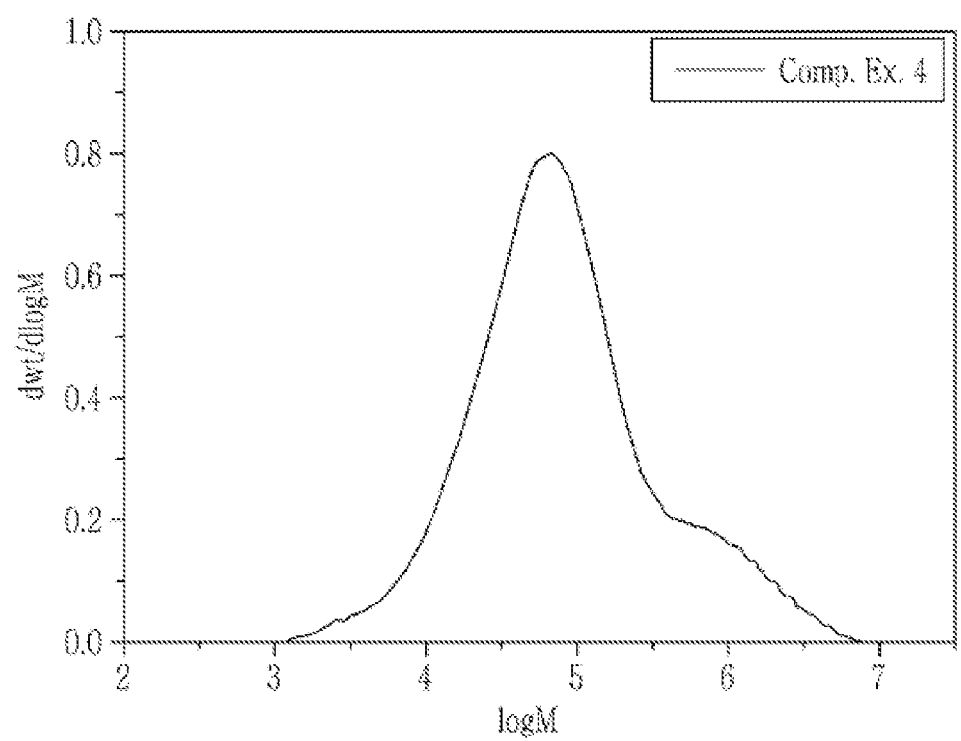

[FIG. 7]
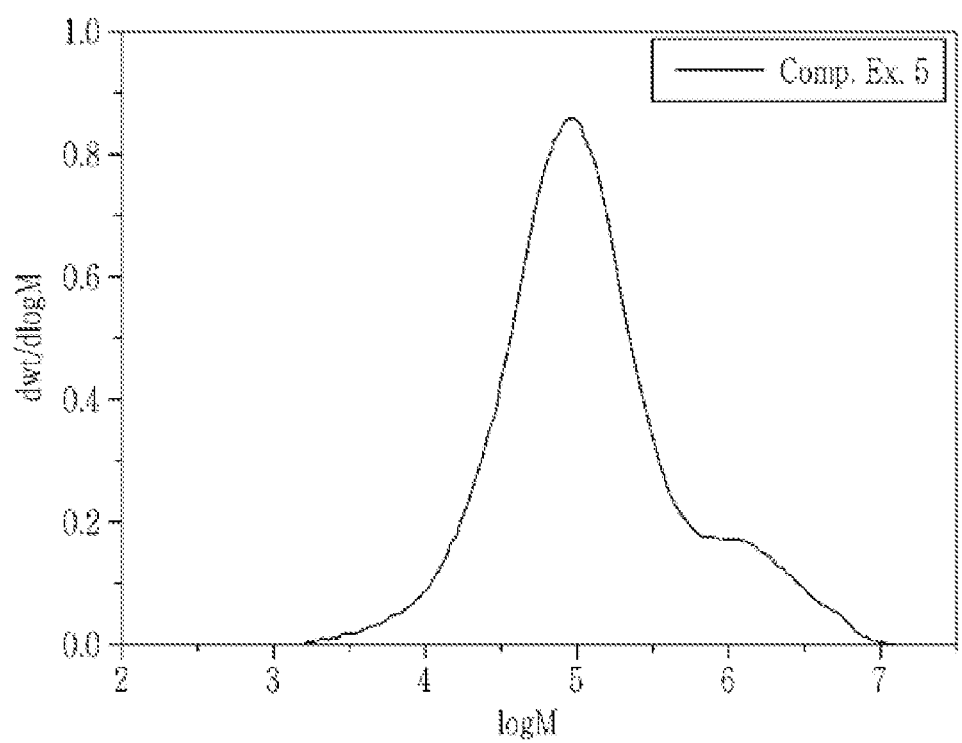

[FIG. 8]
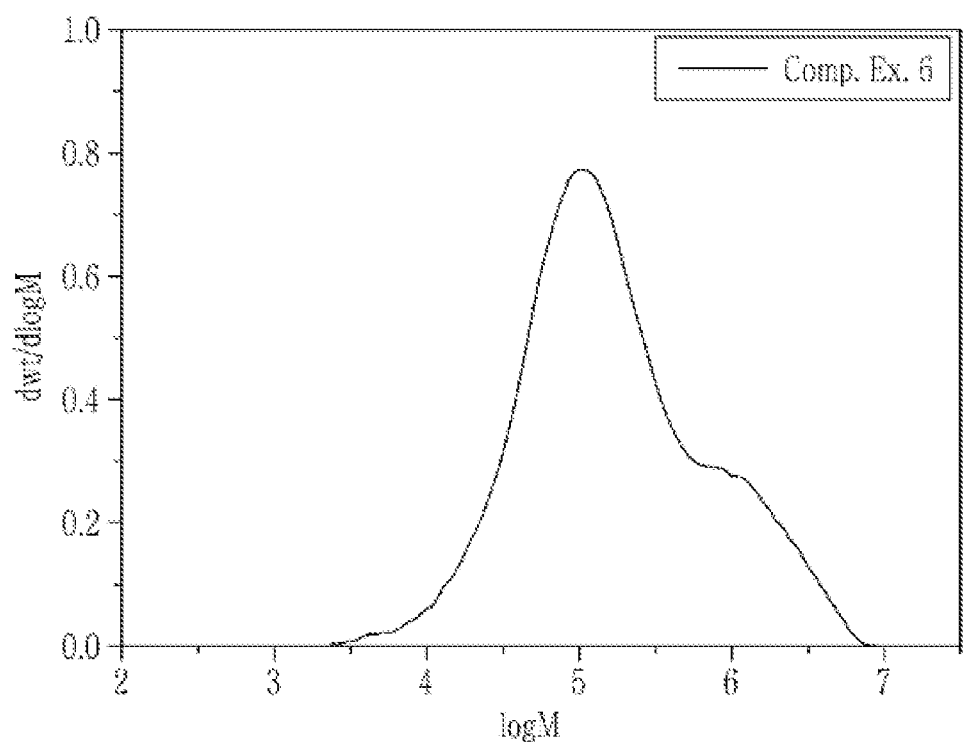

[FIG. 9]
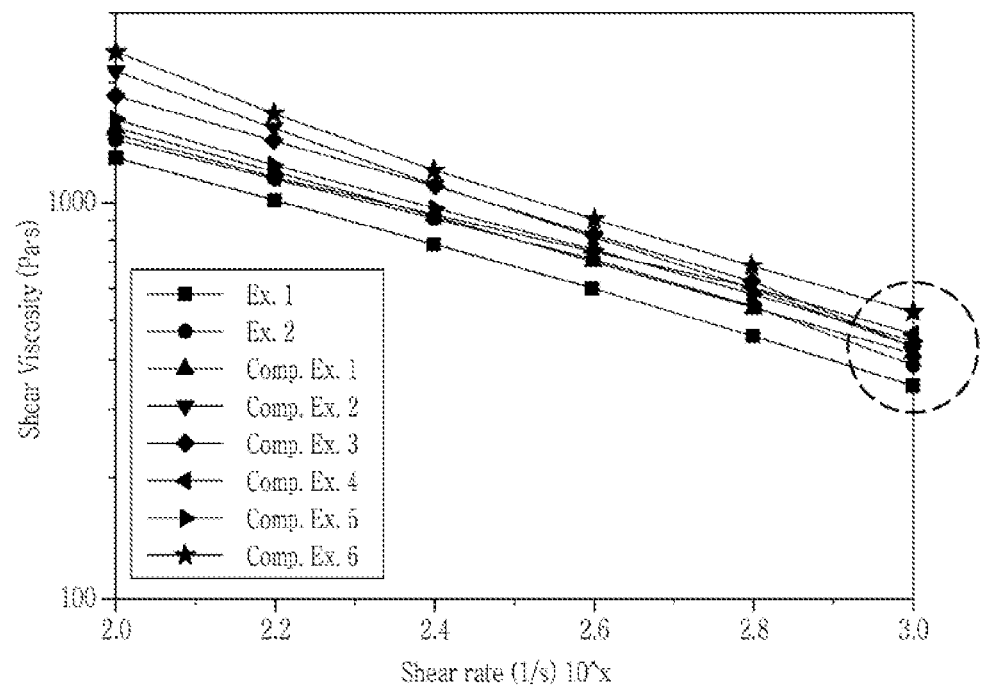

ETHYLENE/1-HEXENE COPOLYMER HAVING EXCELLENT LONG-TERM PHYSICAL PROPERTIES AND PROCESSABILITY

CROSS-REFERENCE TO RELATED APPLICATION(S)

This present application is a national phase entry under 35 U.S.C. § 371 of International Application No. PCT/KR2020/013174 filed Sep. 28, 2020, which claims priority from Korean Patent Application No. 10-2019-0121175 filed Sep. 30, 2019, and Korean Patent Application No. 10-2020-0125236 filed Sep. 25, 2020, all of which are incorporated herein by reference in their entirety.

TECHNICAL FIELD

The present invention relates to an ethylene/1-hexene copolymer having excellent long-term physical properties and processability.

BACKGROUND ART

Polyolefin resins used for large-diameter high-pressure pipe tubes generally require high pressure-resistance characteristic and excellent processability. The high pressure-resistance characteristic is a physical property that is generally expressed in a high density region, and this is because the higher the degree of crystallization in the polyolefin resin, the modulus increases and the strength to withstand a high pressure increases. However, pipes generally have to assure a long-term pressure-resistance stability for at least 50 years, but there is a disadvantage in that, if the density is high, the resistance against the brittle fracture mode is deteriorated and the long-term pressure-resistance characteristic is deteriorated. In addition, when a molecular weight is low or a molecular weight distribution is narrow, a sagging phenomenon (melt sagging phenomenon) occurs during processing of a large-diameter pipe and thus it is difficult to process the pipe. For this reason, a polyolefin resin having a high molecular weight and a very broad molecular weight distribution should be applied to solve these problems. Especially, if the molecular weight is high, an extrusion load is largely generated and pipe appearance becomes poor, and thus a very wide molecular weight distribution is necessarily required.

In general, polymers having a broad molecular weight distribution exhibit a great reduction in viscosity according to a shear rate, and thus exhibit excellent processability in the processing area. Polyolefins prepared by metallocene catalysts exhibit high viscosity at a high shear rate due to a relatively narrow molecular weight distribution, etc., and thus there are drawbacks that a high load or pressure is applied during extrusion to reduce extrusion productivity, bubble stability is greatly reduced upon a blow-molding process, and the prepared articles have non-uniform surfaces to reduce transparency.

Accordingly, a cascade reactor having a plurality of reactors has been used in order to obtain a polyolefin having a broad molecular weight distribution by using the metallocene catalyst, and attempts have been made to obtain a polyolefin satisfying a broader multimodal molecular weight distribution and a higher molecular weight at the same time through each polymerization step in a plurality of reactors.

However, proper polymerization does not occur in a latter reactor depending on a polymerization time in a former reactor, due to high reactivity of the metallocene catalyst. As a result, there were limits to prepare a polyolefin satisfying a sufficiently high molecular weight and a broader multimodal molecular weight distribution at the same time. Accordingly, there is a continuous demand for a technology capable of more effectively preparing a polyolefin which has a high molecular weight and a broader multimodal molecular weight distribution, thereby satisfying mechanical properties and processability at the same time and being preferably used for products.

U.S. Pat. No. 6,180,736 describes a method of producing a polyethylene in a single gas-phase reactor or a continuous slurry reactor using one kind of metallocene catalyst. When this method is used, there are advantages in that the production cost of a polyethylene is lowered, fouling hardly occurs, and the polymerization activity is stable. In addition, U.S. Pat. No. 6,911,508 describes the production of a polyethylene with improved rheological properties, which is polymerized in a single gas-phase reactor using a new metallocene catalyst compound and 1-hexene as a comonomer. However, the polyethylene produced by the above patents also has disadvantages in that it has a narrow molecular weight distribution, and hardly exhibits sufficient impact strength and processability.

U.S. Pat. No. 4,935,474 describes a method of producing a polyethylene having a broad molecular weight distribution by using two or more kinds of metallocene compounds. In addition, U.S. Pat. Nos. 6,841,631 and 6,894,128 describe that a polyethylene having a bimodal or multimodal molecular weight distribution is produced by using a metallocene-type catalyst including at least two kinds of metal compounds, and thus it may be used in various applications such as films, pipes, hollow molded articles, etc. However, although the polyethylene produced in this way has improved processability, it has disadvantages in that, since the distribution state according to the molecular weight in the unit particle is not uniform, the appearance is rough, and the physical properties are not stable even under relatively good processing conditions.

In view of this technical background, there is a continuous demand for the production of more excellent resins having a balance between physical properties or between physical properties and processability, and further research thereon is needed.

DETAILED DESCRIPTION OF THE INVENTION

Technical Problem

In order to solve the problems of the prior art, there is provided an ethylene/1-hexene copolymer having excellent long-term physical properties and processability.

Further, there is provided a pipe manufactured by using the ethylene/1-hexene copolymer.

Technical Solution

In order to achieve the above objects, according to one aspect of the present invention, provided is an ethylene/1-hexene copolymer satisfying the following (i) to (v) conditions:

(i) a shear viscosity, as measured at 210° C. and a shear rate of $1/1000$ sec using a capillary rheometer: 300 Pa·s to 400 Pa·s, (ii) a melt flow rate ratio of $MFR_{21.6}/MFR_{2.16}$, as measured at 190° C. according to ASTM D1238: 90 or more and less than 120,
(iii) a BOCD index according to the following Equation 1: 3.5 to 5,
(iv) a molecular weight distribution: 12 to 15, and
(v) a bimodal molecular weight distribution.

BOCD Index=(SCB content at high molecular weight region–SCB content at low molecular weight region)/(SCB content at low molecular weight region)  [Equation 1]

(in Equation 1, the SCB content at a high molecular weight region and the SCB content at a low molecular weight region represent short chain branch contents at the left and right borders of centered 60% area excluding 20% of the left and right ends in the total area, respectively, when a molecular weight distribution curve is obtained by plotting a log value of a weight average molecular weight on the x-axis, and a molecular weight distribution with respect to the log value on the y-axis)

According to another aspect of the present invention, provided is a pipe manufactured by using the ethylene/1-hexene copolymer.

Advantageous Effects

An ethylene/1-hexene copolymer according to the present invention may have improved long-term physical properties and processability by controlling a ratio of a high molecular weight polymer region and a low molecular weight polymer region in the molecule, and as a result, the ethylene/1-hexene copolymer may be applied to a high-pressure resistant heating pipe, a PE-RT pipe, a large-diameter pipe, etc.

BRIEF DESCRIPTION OF THE DRAWINGS

FIGS. 1 to 8 show a molecular weight distribution curve (GPC curve) obtained from the results of gel permeation chromatography analysis of each copolymer prepared in Examples 1 and 2, and Comparative Examples 1 to 6; and
FIG. 9 is a graph showing a change of a shear viscosity (Pa·s) according to a shear rate of each copolymer prepared in Examples 1 and 2, and Comparative Examples 1 to 6.

DETAILED DESCRIPTION OF THE EMBODIMENTS

In the present invention, the terms "the first", "the second", and the like are used to describe a variety of components, and these terms are merely employed to differentiate a certain component from other components.

Further, the terms used in this description are just for explaining exemplary embodiments and it is not intended to restrict the present invention. The singular expression may include the plural expression unless it is differently expressed contextually. It must be understood that the term "include", "equip", or "have" in the present description is only used for designating the existence of characteristics taken effect, numbers, steps, components, or combinations thereof, and do not exclude the existence or the possibility of addition of one or more different characteristics, numbers, steps, components or combinations thereof beforehand.

While the present invention is susceptible to various modifications and alternative forms, embodiments will be illustrated and described in detail as follows. It should be understood, however, that the description is not intended to limit the present invention to the particular forms disclosed, but on the contrary, the intention is to cover all modifications, equivalents, and alternatives falling within the spirit and scope of the invention.

Hereinafter, the present invention will be described in detail.

High-pressure resistant heating pipes or PE-RT pipes require excellent processability as well as basic mechanical properties. In terms of product structure, a sagging time and processability are in a trade-off relationship. The sagging time is the time taken for a resin to descend 1 m using a 2 L Bloma instrument. A long sagging time is required to increase the pipe diameter, but the high molecular ratio must be increased to secure the long sagging time, which leads to deterioration of processability. In addition, when a low molecular ratio is increased in order to secure processability, the sagging time is shortened.

Accordingly, in the present invention, the low-molecular-weight and high-molecular-weight region ratios in a polymer are controlled at the same time by using a hybrid supported metallocene catalyst including two kinds of metallocene compounds showing low comonomer incorporation in the low molecular weight region and high comonomer incorporation in the high molecular weight region with respect to 1-hexene, and a physical property, specifically, a broad molecular weight distribution of an ethylene/1-hexene copolymer prepared by a multimodal polymerization process is achieved through a unimodal polymerization process in a single reactor, thereby securing the sagging time and improving processability at the same time.

Specifically, the ethylene/1-hexene copolymer according to one specific embodiment of the present invention satisfies the following (a1) to (a5) conditions:
(a1) a shear viscosity ($\eta_{1000}$), as measured at 210° C. and a shear rate of $1/1000$ sec using a capillary rheometer: 300 Pa·s to 400 Pa·s,
(a2) a melt flow rate ratio (MFRR, $MFR_{21.6}/MFR_{2.16}$), as measured at 190° C. according to ASTM D1238: 90 or more and less than 120,
(a3) a BOCD index according to the following Equation 1: 3.5 to 5,
(a4) a molecular weight distribution: 12 to 15, and
(a5) a bimodal molecular weight distribution.

BOCD Index=(SCB content at high molecular weight region–SCB content at low molecular weight region)/(SCB content at low molecular weight region)  Equation [1]

(in Equation 1, the SCB content at a high molecular weight region and the SCB content at a low molecular weight region are the same as defined above)

Further, the ethylene/1-hexene copolymer may further satisfy one or more, two or more, or four or more of the following (a1') to (a4') conditions:
(a1') a shear viscosity, as measured at 210° C. and a shear rate of $1/1000$ sec using a capillary rheometer: 320 Pa·s to 390 Pa·s,
(a2') a melt flow rate ratio of $MFR_{21.6}/MFR_{2.16}$, as measured at 190° C. according to ASTM D1238: 95 to 110,
(a3') a BOCD index according to the following Equation 1: 3.6 to 4.8, and
(a4') a molecular weight distribution: 12.5 to 14.8.

Specifically, the ethylene/1-hexene copolymer according to one embodiment of the present invention has a shear viscosity ($\eta_{1000}$) of 300 Pa·s to 400 Pa·s, as measured at 210° C. and shear rate $1/1000$ sec using a capillary rheometer.

The shear rate is a shear rate applied during processing of the polymer, and may be adjusted according to a processing method. In addition, the temperature is a processing temperature of a polymer. For example, when a polymer is used for extrusion or injection, it means a temperature applied to an extrusion or injection process. The temperature may be adjusted according to the polymer to be applied, and in the present invention, the temperature for the ethylene/1-hexene copolymer may be 190° C. to 230° C., more specifically 210° C.

The shear viscosity measured under such temperature and shear rate conditions during processing is related to processability during pipe extrusion. A lower shear viscosity indicates better processability. However, when the shear viscosity is too low, specifically, when it is less than 300 Pa·s, MI is too high to manufacture the pipe, and there is a problem of FNCT deterioration. In addition, when the shear viscosity is too high, specifically, when it exceeds 400 Pa·s, a processing load and torque are increased during extrusion, and thus it is difficult to increase RPM, and a linear velocity decreases. In addition, an excessively high shear viscosity causes melt fracture, gloss deterioration, and protrusion production on appearance of a pipe product. Therefore, the ethylene/1-hexene copolymer according to one embodiment of the present invention exhibits a shear viscosity in the above-described range by controlling its molecular weight through control of hydrogen input conditions during preparation. As a result, the ethylene/1-hexene copolymer may exhibit excellent processability without a concern about deterioration of the FNCT effect. More specifically, the ethylene/1-hexene copolymer may exhibit a shear viscosity of 300 Pa·s or more, 320 Pa·s or more, or 340 Pa·s or more, and 400 Pa·s or less, 390 Pa·s or less, or 380 Pa·s or less.

Further, the ethylene/1-hexene copolymer has a melt flow rate ratio (MFRR; $MFR_{21.6}/MFR_{2.16}$) of 90 or more and less than 120, as measured at 190° C. according to ASTM D1238. When the ethylene/1-hexene copolymer has the melt flow rate ratio in the above-described range, flowability at each load is appropriately controlled, and thus processability and mechanical properties may be improved at the same time. More preferably, the melt flow rate ratio may be 90 or more, 95 or more, or 100 or more, and less than 120, 110 or less, or 105 or less.

Further, the ethylene/1-hexene copolymer has a BOCD index (Broad Orthogonal Co-monomer Distribution Index) of 3.5 or more and 5 or less, as calculated according to the following Equation 1.

As used herein, the BOCD structure refers to a structure in which the content of a comonomer such as alpha-olefin is concentrated at a high molecular weight main chain, i.e., a structure in which the content of a short chain branch (SCB) increases toward the higher molecular weight region.

The BOCD index may be calculated as follows: a weight average molecular weight, a molecular weight distribution, and SCB content may be measured at the same time by GPC-FTIR instrument, and the BOCD index may be calculated based on the following Equation 1 by obtaining a molecular weight distribution curve by plotting a log value (log M) of a molecular weight (M) on the x-axis, and a molecular weight distribution (dwt/dlog M) with respect to the log value on the y-axis, and then measuring the SCB (Short Chain Branch) content (content of branches having 2 to 7 carbon atoms per 1,000 carbons, unit: branch/1,000 C) at the left and right borders of centered 60% area excluding 20% of the left and right ends in the total area. In this regard, the SCB content at a high molecular weight region and the SCB content at a low molecular weight region mean SCB content values at the left and right borders of centered 60% area, excluding 20% of the left and right ends, respectively.

BOCD Index=(SCB content at high molecular weight region−SCB content at low molecular weight region)/(SCB content at low molecular weight region)  Equation [1]

When the BOCD index is 0 or less, the polymer has no BOCD structure, and when BOCD index is more than 0, the polymer has the BOCD structure. As the polymer has a higher value of the BOCD index, it has a structure in which the SCB content is high in the high molecular weight region.

Further, the ethylene/1-hexene copolymer according to one embodiment of the present invention may have a high BOCD index of 3.5 or more and 5 or less, thereby having the high comonomer such as alpha-olefin content in the high molecular weight region, and as a result, the ethylene/1-hexene copolymer may exhibit excellent pressure-resistance characteristic and stress cracking resistance. The ethylene/1-hexene copolymer has a broad molecular weight distribution of 12 to 15. It is difficult to prepare a copolymer satisfying such a broad molecular weight distribution while having a BOCD index of more than 5. More specifically, the ethylene/1-hexene copolymer has a BOCD index of 3.5 or more, 3.6 or more, or 3.8 or more, and 5 or less, 4.8 or less, or 4.5 or less.

Further, the ethylene/1-hexene copolymer exhibits a bimodal molecular weight distribution upon GPC analysis. This type of molecular weight distribution means that the low molecular weight content and the high molecular weight content are high, and as a result, it may exhibit more excellent effects in terms of physical properties and processability.

Meanwhile, since the existing ethylene/1-hexene copolymers are prepared by a multimodal polymerization process, their molecular weight distribution is broad, and as a result, physical properties and processability have been secured. In the present invention, a catalyst composition including two kinds of metallocene compounds described below may be used to perform a monomodal polymerization process in a single reactor, thereby achieving a broad molecular weight distribution in the ethylene/1-hexene copolymer.

Specifically, the ethylene/1-hexene copolymer may exhibit a broad molecular weight distribution (Mw/Mn, PDI) of 12 to 15, and as a result, it may exhibit excellent physical property and processability. More specifically, the ethylene/1-hexene copolymer has a molecular weight distribution of 12 or more, or 12.5 or more, and 15 or less, or 14.8 or less.

Meanwhile, in the present invention, the molecular weight distribution of the ethylene/1-hexene copolymer may be determined by measuring a weight average molecular weight (Mw) and a number average molecular weight (Mn) of the ethylene/1-hexene copolymer, respectively, and then calculating a ratio (Mw/Mn) of the weight average molecular weight to the number average molecular weight. Further, the weight average molecular weight and the number average molecular weight may be measured by gel permeation chromatography (GPC), and a specific measurement method will be described in more detail in Experimental Example below.

The ethylene/1-hexene copolymer may further satisfy one or more, two or more, three or more, four or more, five or more, or six of the following (b1) to (b6) conditions, in addition to the (a1) to (a5) conditions:

(b1) a density, as measured according to ASTM 1505: 0.94 $g/cm^3$ to 0.95 $g/cm^3$, (b2) a melt index, as measured at 190° C. under a load of 2.16 kg according to ASTM D1238: 0.1 g/10 min to 0.5 g/10 min, (b3) a high load melt index, as measured at 190° C. under a load of 21.6 kg according to ASTM D1238: 15 g/10 min to 30 g/10 min, (b4) a weight average molecular weight (Mw): 10,000 g/mol to 400,000 g/mol, (b5) stress cracking resistance, as measured by a full notch creep test under conditions of 4.0 MPa and 80° C. according to ISO 16770: 2,000 hr to 20,000 hr, and (b6) the content of 1-hexene in the ethylene/1-hexene copolymer: 5% by weight to 10% by weight, based on the total weight of the copolymer.

Specifically, the ethylene/1-hexene copolymer has a density of 0.94 g/cm$^3$ to 0.95 g/cm$^3$, as measured according to ASTM 1505. When the density is less than 0.94 g/cm$^3$, there is a concern about deterioration of the pressure-resistance effect. When the density is more than 0.95 g/cm$^3$, there is a concern about deterioration of FNCT. When the ethylene/1-hexene copolymer has a density in the above range, it may exhibit the effect of improving FNCT without a concern about deterioration of the pressure resistance or generation of problems. More specifically, the density of the ethylene/1-hexene copolymer may be 0.942 g/cm$^3$ or more, or 0.945 g/cm$^3$ or more, and 0.948 g/cm$^3$ or less, or 0.946 g/cm$^3$ or less.

Further, a melt index of (MI$_{2.16}$) of the ethylene/1-hexene copolymer is 0.1 g/10 min to 0.5 g/10 min, as measured at 190° C. under a load of 2.16 kg according to ASTM D1238. When the melt index is less than 0.1 g/10 min, there is a concern about deterioration of processability, and when the melt index is more than 0.5 g/10 min, there is a concern about deterioration of FNCT. In the present invention, the ethylene/1-hexene copolymer has a melt index in the above range, thereby exhibiting excellent effect of improving processability without deterioration of FNCT. More specifically, the melt index of the ethylene/1-hexene copolymer is 0.11 g/10 min or more, or 0.13 g/10 min or more, and 0.3 g/10 min or less, or 0.25 g/10 min or less.

Further, the ethylene/1-hexene copolymer has a high load melt index (HLMI) of 15 g/10 min to 30 g/10 min, as measured at 190° C. under a load of 21.6 kg according to ASTM D1238. The high load melt index represents processability. When the high load melt index is less than 15 g/10 min, there is a concern about deterioration of processability, and when the high load melt index is more than 30 g/10 min, there is a concern about deterioration of FNCT. In the present invention, when the ethylene/1-hexene copolymer has a high load melt index in the above range, it may exhibit the effect of improving processability without a concern about deterioration of FNCT. More specifically, the high load melt index of the ethylene/1-hexene copolymer is 16 g/10 min or more, or 16.5 g/10 min or more, and 30 g/10 min or less, or 25 g/10 min or less.

Further, the ethylene/1-hexene copolymer has a weight average molecular weight (Mw) of 10,000 g/mol or more, or 100,000 g/mol or more, and 400,000 g/mol or less, or 300,000 g/mol or less.

Generally, a polymer prepared by using a metallocene catalyst has a trade-off relationship between processability and mechanical properties according to a weight average molecular weight. In other words, when the weight average molecular weight increases, the mechanical properties are improved while the processability decreases. On the contrary, when the weight average molecular weight decreases, the processability is improved while the mechanical properties decrease. In contrast, the ethylene-1-hexene copolymer has a weight average molecular weight in the above range in addition to the above-described molecular weight distribution condition, thereby exhibiting a good balance between processability and mechanical properties.

In the present invention, the weight average molecular weight of the ethylene/1-hexene copolymer may be measured by gel permeation chromatography (GPC), and a specific measurement method will be described in more detail in Experimental Example below.

Meanwhile, ethylene/1-hexene copolymer resins used in large-diameter high-pressure pipes require stress cracking resistance (Full Notch Creep Test, FNCT) which is a characteristic capable of withstanding high temperature and high pressure.

The ethylene/1-hexene copolymer according to one embodiment of the present invention may have the above-described physical properties to exhibit excellent stress cracking resistance. Specifically, the ethylene/1-hexene copolymer has stress cracking resistance of 2,000 hr or more, more specifically 2300 hr or more, as measured by a full notch creep test (FNCT) at 4.0 MPa and 80° C. according to ISO 16770. As the value of stress cracking resistance is higher, physical properties are better, and thus there is no practical upper limit, but it may be, for example, 20,000 hr or less, or 10,000 hr or less, or 5,000 hr or less.

In the ethylene/1-hexene copolymer, a 1-hexene comonomer is included in an amount of 5% by weight or more, or 6% by weight or more, and 10% by weight or less, or 8% by weight or less, based on the total weight of the copolymer.

The ethylene/1-hexene copolymer having the above-described physical properties may be prepared by a method including the step of copolymerizing ethylene and 1-hexene while introducing hydrogen gas in the presence of a catalyst composition including a first metallocene compound represented by the following Chemical Formula 1 and a second metallocene compound represented by the following Chemical Formula 2 in a single reactor. Therefore, according to another embodiment of the present invention, provided is a method of preparing the ethylene/1-hexene copolymer:

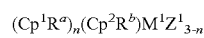   [Chemical Formula 1]

in Chemical Formula 1,

M$^1$ is a transition metal of Group 4;

Cp$^1$ and Cp$^1$ are each cyclopentadienyl, which is substituted or unsubstituted with C$_{1-20}$ hydrocarbon;

R$^a$ and R$^b$ are the same as or different from each other, and each independently hydrogen, C$_{1-20}$ alkyl, C$_{1-20}$ alkoxy, C$_{2-20}$ alkoxyalkyl, C$_{6-20}$ aryl, C$_{6-20}$ aryloxy, C$_{2-20}$ alkenyl, C$_{7-40}$ alkylaryl, C$_{7-40}$ arylalkyl, C$_{8-40}$ arylalkenyl, C$_{2-20}$ alkynyl, or C$_{2-20}$ heteroaryl including one or more heteroatoms selected from the group consisting of N, O, and S;

Z$^1$ is halogen, C$_{1-20}$ alkyl, C$_{2-20}$ alkenyl, C$_{7-40}$ alkylaryl, C$_{7-40}$ arylalkyl, C$_{6-20}$ aryl, a substituted or unsubstituted amino group, C$_{2-20}$ alkylalkoxy, or C$_{7-40}$ arylalkoxy; and n is 1 or 0;

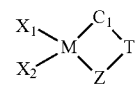   [Chemical Formula 2]

in Chemical Formula 2,

C$_1$ is any one of ligands represented by the following Chemical Formulae 3 to 6,

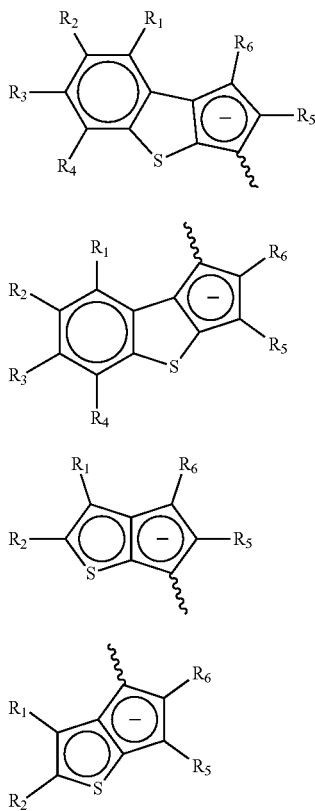

[Chemical Formula 3]

[Chemical Formula 4]

[Chemical Formula 5]

[Chemical Formula 6]

in Chemical Formulae 3 to 6, $R_1$ to $R_6$ are the same as or different from each other, and each independently, hydrogen, $C_{1-30}$ alkyl, $C_{1-30}$ alkoxy, $C_{2-30}$ alkoxyalkyl, $C_{6-30}$ aryl, $C_{6-30}$ aryloxy, $C_{2-30}$ alkenyl, $C_{2-30}$ alkynyl, $C_{3-30}$ cycloalkyl, $C_{7-40}$ alkylaryl, $C_{8-40}$ alkenylaryl, $C_{8-40}$ alkynylaryl, $C_{7-40}$ arylalkyl, $C_{8-40}$ arylalkenyl, or $C_{8-40}$ arylalkynyl, M is Ti, Zr, or Hf, Z is —O—, —S—, —$NR_7$—, or —$PR_7$—, $R_7$ is hydrogen, $C_{1-30}$ alkyl, $C_{6-30}$ aryl, $C_{2-30}$ alkenyl, $C_{2-30}$ alkynyl, $C_{3-30}$ cycloalkyl, $C_{7-40}$ alkylaryl, $C_{8-40}$ alkenylaryl, $C_{8-40}$ alkynylaryl, $C_{7-40}$ arylalkyl, $C_{8-40}$ arylalkenyl, $C_{8-40}$ arylalkynyl, $C_{1-30}$ alkoxysilyl, $C_{1-30}$ alkoxysilyl, $C_{6-30}$ aryloxysilyl, $C_{1-30}$ alkylsilyl, or $C_{1-30}$ silylalkyl, $X_1$ and $X_2$ are the same as or different from each other, and each independently, halogen, $C_{1-30}$ alkyl, $C_{2-30}$ alkenyl, $C_{7-30}$ alkylaryl, $C_{7-30}$ arylalkyl, $C_{6-20}$ aryl, a substituted or unsubstituted amino group, $C_{2-30}$ alkylalkoxy, or $C_{7-30}$ arylalkoxy, T is

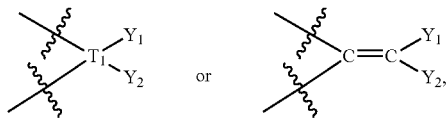

$T_1$ is C, Si, Ge, Sn, or Pb, $Y_1$ is hydrogen, $C_{1-30}$ alkyl, $C_{1-30}$ alkoxy, $C_{2-30}$ alkoxyalkyl, $C_{6-30}$ aryl, $C_{6-30}$ aryloxy, $C_{2-30}$ alkenyl, $C_{2-30}$ alkynyl, $C_{3-30}$ cycloalkyl, $C_{7-40}$ alkylaryl, $C_{8-40}$ alkenylaryl, $C_{8-40}$ alkynylaryl, $C_{7-40}$ arylalkyl, $C_{8-40}$ aryl-alkenyl, or $C_{8-40}$ arylalkynyl, silyl (—$SiH_3$), $C_{1-30}$ alkoxysilyl, $C_{2-30}$ alkoxyalkylsilyl, $C_{6-30}$ aryloxysilyl, $C_{1-30}$ haloalkyl, $C_{6-30}$ haloaryl, or —$NR_9R_{10}$, $Y_2$ is $C_{2-30}$ alkoxyalkyl, or $C_{7-40}$ aryloxyalkyl, and $R_9$ and $R_{10}$ are each independently hydrogen, $C_{1-30}$ alkyl, $C_{6-30}$ aryl, $C_{2-30}$ alkenyl, $C_{2-30}$ alkynyl, $C_{3-30}$ cycloalkyl, $C_{7-40}$ alkylaryl, $C_{8-40}$ alkenylaryl, $C_{8-40}$ alkynylaryl, $C_{7-40}$ arylalkyl, $C_{8-40}$ arylalkenyl, or $C_{8-40}$ arylalkynyl, or connected to each other to form an aliphatic or aromatic ring.

Meanwhile, unless otherwise specified herein, the following terms may be defined as follows.

The halogen may be fluorine (F), chlorine (Cl), bromine (Br), or iodine (I).

The $C_{1-30}$ alkyl group may be a linear, branched, or cyclic alkyl group. Specifically, the $C_{1-20}$ alkyl group may be a $C_{1-15}$ linear alkyl group; a $C_{1-10}$ linear alkyl group; a $C_{1-5}$ linear alkyl group; a $C_{3-20}$ branched or cyclic alkyl group; a $C_{3-15}$ branched or cyclic alkyl group; or a $C_{3-10}$ branched or cyclic alkyl group. More specifically, the $C_{1-20}$ alkyl group may be a methyl group, an ethyl group, an n-propyl group, an isopropyl group, an n-butyl group, an isobutyl group, a tert-butyl group, an n-pentyl group, an iso-pentyl group, a neo-pentyl group, a cyclohexyl group, or the like.

The $C_{2-30}$ alkenyl group may be a linear, branched, or cyclic alkenyl group. Specifically, the $C_{2-30}$ alkenyl group may be a $C_{2-20}$ linear alkenyl group, a $C_{2-10}$ linear alkenyl group, a $C_{2-5}$ linear alkenyl group, a $C_{3-20}$ branched alkenyl group, a $C_{3-15}$ branched alkenyl group, a $C_{3-10}$ branched alkenyl group, a $C_{5-20}$ cyclic alkenyl group, or a $C_{5-10}$ cyclic alkenyl group. More specifically, the $C_{2-20}$ alkenyl group may be an ethenyl group, a propenyl group, a butenyl group, a pentenyl group, a cyclohexenyl group, or the like.

The $C_{6-30}$ aryl may be a monocyclic, bicyclic, or tricyclic aromatic hydrocarbon. Specifically, the $C_{6-30}$ aryl may be phenyl, naphthyl, anthracenyl, or the like.

The $C_{7-40}$ alkylaryl may include substituents in which one or more hydrogens of the aryl are substituted with alkyl. Specifically, the $C_{7-40}$ alkylaryl may be methylphenyl, ethylphenyl, n-propylphenyl, iso-propylphenyl, n-butylphenyl, iso-butylphenyl, tert-butylphenyl, cyclohexylphenyl, or the like.

The $C_{7-40}$ arylalkyl may include substituents in which one or more hydrogens of the alkyl are substituted with aryl. Specifically, the $C_{7-40}$ arylalkyl may be benzyl, phenylpropyl, phenylhexyl, or the like.

The $C_{1-20}$ alkoxy may include methoxy, ethoxy, phenyloxy, cyclohexyloxy or the like, but is not limited thereto.

The $C_{2-20}$ alkoxyalkyl group may be a functional group in which one or more hydrogens of the alkyl group as described above are substituted with alkoxy, and specifically, may include alkoxyalkyl such as methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, or the like; or aryloxyalkyl such as phenoxyhexyl, or the like, but is not limited thereto.

The $C_{1-20}$ alkylsilyl group or the $C_{1-20}$ alkoxysilyl group may be a functional group in which one to three hydrogens of —$SiH_3$ are substituted with one to three alkyl groups or alkoxy groups as described above, and specifically, may include alkylsilyl such as methylsilyl, dimethylsilyl, trimethylsilyl, dimethyl ethyl silyl, diethylmethyl silyl, dimethylpropylsilyl, or the like; alkoxysilyl such as methoxysilyl, dimethoxysilyl, trimethoxysilyl, dimethoxyethoxysilyl, or the like; alkoxyalkylsilyl such as methoxydimethylsilyl, diethoxymethylsilyl, dimethoxypropylsilyl, or the like, but is not limited thereto.

The $C_{1-20}$ silylalkyl group is a functional group in which one or more hydrogens of the alkyl group as described above are substituted with silyl, and specifically, may include —CH$_2$—SiH$_3$, methylsilylmethyl, dimethylethoxysilylpropyl, or the like, but is not limited thereto.

The sulfonate group has a structure of —O—SO$_2$—R', wherein R' may be a $C_{1-20}$ alkyl group. Specifically, the $C_{1-20}$ sulfonate group may include a methanesulfonate group, a phenylsulfonate group, or the like, but is not limited thereto.

The heteroaryl is $C_{2-20}$ heteroaryl including one or more of N, O, and S as a heteroatom, and specific examples thereof may include xanthene, thioxanthen, thiophene, furan, pyrrole, imidazole, thiazole, oxazole, oxadiazole, triazole, pyridyl, bipyridyl, pyrimidyl, triazine, acridyl, pyridazine, pyrazinyl, quinolinyl, quinazoline, quinoxalinyl, phthalazinyl, pyrido pyrimidinyl, pyrido pyrazinyl, pyrazino pyrazinyl, isoquinoline, indole, carbazole, benzoxazole, benzoimidazole, benzothiazole, benzocarbazole, benzothiophene, dibenzothiophene, benzofuranyl, phenanthroline, isooxazolyl, thiadiazolyl, phenothiazinyl, dibenzofuranyl, or the like, but is not limited thereto.

The above-described substituents may be optionally, within a range exhibiting the identical or similar effect to the desired effect, substituted with one or more substituents selected from the group consisting of hydroxyl; halogen; alkyl, alkenyl, aryl, or alkoxy; alkyl, alkenyl, aryl, or alkoxy including one or more hetero atoms among hetero atoms of Group 14 to 16; silyl; alkylsilyl or alkoxysilyl; phosphine; phosphide; sulfonate; and sulfone.

In addition, two substituents adjacent to each other are connected to each other to form an aliphatic or aromatic ring, which means that the atom(s) of the two substituents and the atoms to which the two substituents are bound are connected to each other to form a ring. Specifically, $R_9$ and $R_{10}$ of —NR$_9$R$_{10}$ are connected to each other to form an aliphatic ring, which may be exemplified by piperidinyl or the like. $R_9$ and $R_{10}$ of —NR$_9$R$_{10}$ are connected to each other to form an aromatic ring, which may be exemplified by pyrrolyl or the like.

Further, examples of the transition metal of Group 4 include titanium (Ti), zirconium (Zr), hafnium (Hf), or the like, but are not limited thereto.

In the catalyst composition, the first metallocene compound represented by Chemical Formula 1 is a non-crosslinked compound containing ligands of Cp$^1$ and Cp$^2$, and it is advantageous in mainly preparing a low molecular weight copolymer having a low SCB (short chain branch) content.

Specifically, in the Chemical Formula 1, the ligands of Cp$^1$ and Cp$^2$ may be the same as or different from each other, and may be each cyclopentadienyl substituted with one or more, or 1 to 3 $C_{1-10}$ alkyl. As described, the ligands of Cp$^1$ and Cp$^2$ may have an unshared electron pair which may act as a Lewis base, thereby exhibiting a high polymerization activity. In particular, since the ligands of Cp$^1$ and Cp$^2$ are cyclopentadienyl having relatively low steric hindrance, they may exhibit high polymerization activity and low hydrogen reactivity, thereby polymerizing a low-molecular-weight olefin polymer with high activity.

Further, the ligands of Cp$^1$ and Cp$^2$ may easily control, for example, characteristics of the olefin polymer to be prepared, such as chemical structure, molecular weight, molecular weight distribution, mechanical properties, transparency, etc., by controlling the effect of steric hindrance according to the kind of substituted functional groups. Specifically, the ligands of Cp$^1$ and Cp$^2$ may be substituted with R$^a$ and R$^b$, respectively. In this regard, R$^a$ and R$^b$ are the same as or different from each other, and each independently, hydrogen, $C_{1-20}$ alkyl, $C_{2-20}$ alkoxyalkyl, $C_{7-40}$ arylalkyl, or $C_{2-12}$ heteroaryl including one or more hetero atoms selected from the group consisting of N, O, and S, and more specifically, $C_{1-10}$ alkyl, $C_{2-10}$ alkoxyalkyl, $C_{7-20}$ arylalkyl, or $C_{4-12}$ heteroaryl including one or more hetero atoms selected from the group consisting of N, O, and S.

Further, $M^1Z^1_{3-n}$ exists between the ligands of Cp$^1$ and Cp$^2$, and $M^1Z^1_{3-n}$ may affect storage stability of a metal complex. To more effectively ensure the effect, Z$^1$ may be each independently halogen or $C_{1-20}$ alkyl, and more specifically, each independently F, Cl, Br, or I. Further, M$^1$ may be Ti, Zr, or Hf; Zr or Hf; or Zr.

The first transition metal compound may be a compound having Chemical Formula 1, wherein Cp$^1$ and Cp$^2$ are each unsubstituted or substituted cyclopentadienyl, R$^a$ and R$^b$ are each independently hydrogen, $C_{1-10}$ alkyl, $C_{2-10}$ alkoxyalkyl, or $C_{7-20}$ arylalkyl, at least one of R$^a$ and R$^b$ is a substituent of alkoxyalkyl such as t-butoxyhexyl, more specifically, —(CH$_2$)n-OR (wherein R is a linear or branched alkyl group having 1 to 6 carbon atoms, and n is an integer of 2 to 4). In this regard, when a polyolefin is prepared using a comonomer, the catalyst may exhibit a low conversion rate of the copolymer to prepare a low-molecular-weight polyolefin in which degree of copolymerization or comonomer distribution is controlled, as compared with other Cp-based catalysts including no substituent. Further, when the first transition metal compound having such a structure is supported on a support, —(CH$_2$)n-OR group among the substituents may form a covalent bond through close interaction with a silanol group on the surface of silica used as the support, thereby enabling stable supporting polymerization.

The first metallocene compound represented by Chemical Formula 1 may be, for example, a compound represented by any one of the following structural formulae, but is not limited thereto:

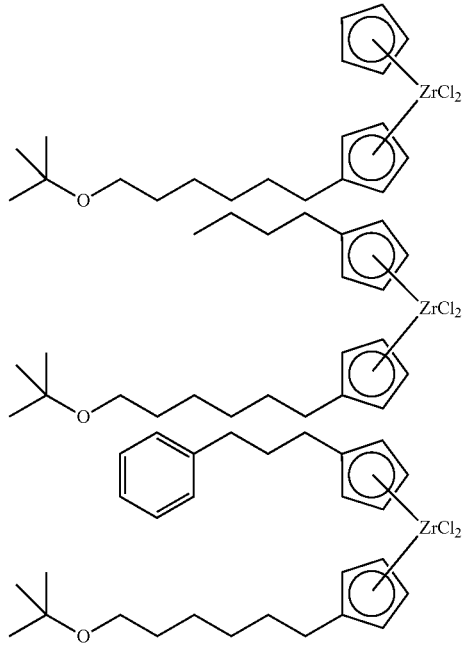

-continued

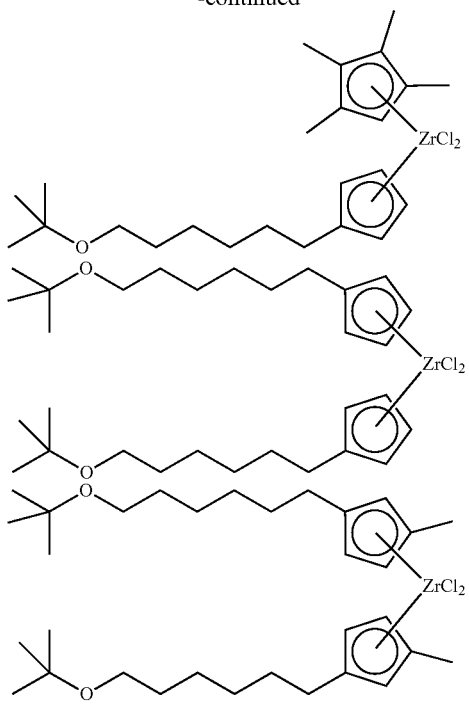

Further, the second metallocene compound may include an aromatic cyclic compound including thiophene and a base compound including Group 14 or 15 element as different ligands, and may have a structure in which the different ligands are crosslinked by -T-, and $M(X_1)(X_2)$ exists between the different ligands. Therefore, the second metallocene compound exhibits high catalytic activity, and is advantageous in preparing a high-molecular-weight polymer.

More specifically, in Chemical Formula 2, M may be Ti, Zr, or Hf, and more specifically, Ti.

Further, $R_1$ to $R_4$ may be each independently hydrogen, or $C_{1-20}$ alkyl, and more specifically, hydrogen or methyl.

Further, $R_5$ and $R_6$ may be each independently $C_{1-10}$ alkyl, and more specifically, both of $R_5$ and $R_6$ may be methyl.

Further, Z may be —$NR_7$—, $R_7$ may be $C_{1-10}$ alkyl, more specifically, $C_{3-10}$ branched alkyl such as t-butyl.

Further, T is

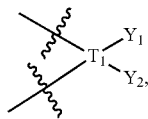

$T_1$ is C or Si, $Y_1$ is $C_{1-20}$ alkyl, $C_{1-20}$ alkoxy, $C_{2-20}$ alkoxyalkyl, $C_{6-20}$ aryl, $C_{7-30}$ alkylaryl, $C_{7-30}$ arylalkyl, $C_{6-20}$ aryloxy, or $C_{7-30}$ aryloxyalkyl, $Y_2$ is $C_{2-20}$ alkoxyalkyl, or $C_{7-30}$ aryloxyalkyl, and more specifically, $Y_1$ may be any one of methyl, ethyl, n-propyl, and n-butyl, and $Y_2$ is $C_{2-20}$ alkoxyalkyl, or $C_{7-30}$ aryloxyalkyl, and more specifically, $Y_2$ may be any one of methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, and phenoxyhexyl.

Further, $X_1$ and $X_2$ may be each independently halogen or $C_{1-20}$ alkyl, and more specifically, chloro.

For example, the second metallocene compound having more excellent activity, and capable of improving copolymerizability of ethylene and expressing an ultra-high-molecular weight polymer may be exemplified by compounds represented by the following Chemical Formulae 2a to 2d:

[Chemical Formula 2a]

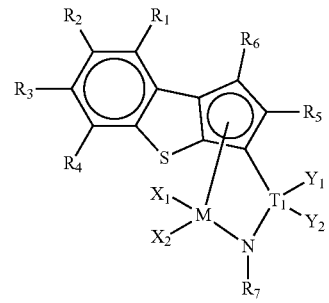

[Chemical Formula 2b]

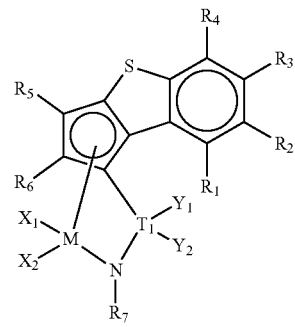

[Chemical Formula 2c]

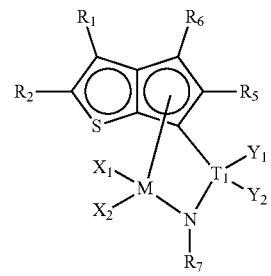

[Chemical Formula 2d]

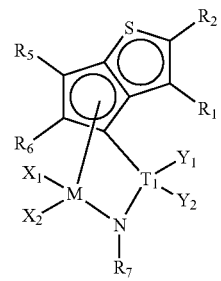

In Chemical Formulae 2a to 2d, $R_1$ to $R_7$, M, $X_1$, $X_2$, $T_1$, $Y_1$, and $Y_2$ are the same as defined above.

More specifically, in Chemical Formulae 2a to 2d of the second metallocene compound, M is Ti, Zr, or Hf, and more specifically Ti; $R_1$ to $R_4$ are each independently hydrogen, or $C_{1-20}$ alkyl, and more specifically, hydrogen or methyl; $R_5$ and $R_6$ are each independently $C_{1-10}$ alkyl, and more specifically, both of $R_5$ and $R_6$ are methyl; $R_7$ is $C_{1-10}$ alkyl, and more specifically, $C_{3-10}$ branched alkyl such as t-butyl; $T_1$ is C or Si, $Y_1$ is $C_{1-20}$ alkyl, $C_{1-20}$ alkoxy, $C_{2-20}$ alkoxyalkyl, $C_{6-20}$ aryl, $C_{7-30}$ alkylaryl, $C_{7-30}$ arylalkyl, $C_{6-20}$ aryloxy, or $C_{7-30}$ aryloxyalkyl, $Y_2$ is $C_{2-20}$ alkoxyalkyl, or $C_{7-30}$ aryloxyalkyl, and more specifically, $Y_1$ is any one of methyl, ethyl, n-propyl, and n-butyl, $Y_2$ is $C_{2-20}$ alkoxyalkyl, or $C_{7-30}$ aryloxyalkyl, and more specifically, $Y_2$ is any one of methoxymethyl, methoxyethyl, ethoxymethyl, iso-propoxymethyl, iso-propoxyethyl, iso-propoxyhexyl, tert-butoxymethyl, tert-butoxyethyl, tert-butoxyhexyl, and phenoxyhexyl, $X_1$ and $X_2$ are each independently halogen or $C_{1-20}$ alkyl, and more specifically, chloro.

More specifically, specific examples of the second metallocene compound may be exemplified by compounds having the following structures, but are not limited thereto:

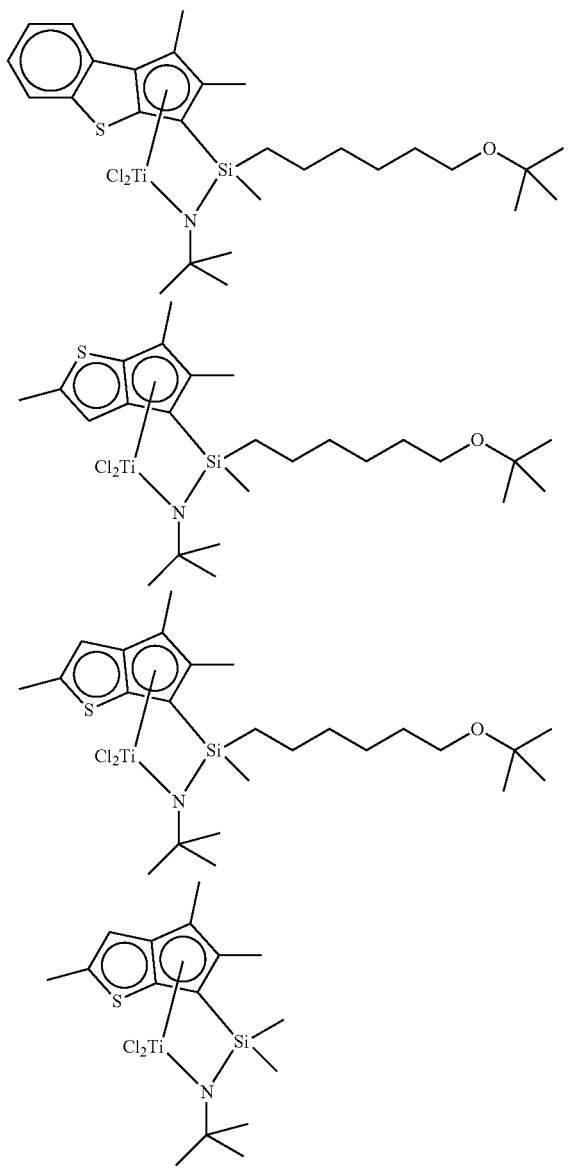

The first and second metallocene compounds may be synthesized by applying the known reactions, and a more detailed synthesis method refers to Synthesis Examples.

As described above, in the catalyst composition, the first metallocene compound represented by Chemical Formula 1 may mainly contribute to preparing a low-molecular-weight copolymer region having a low SCB content, and the second metallocene compound represented by Chemical Formula 2 may mainly contribute to preparing a high-molecular-weight copolymer region having a high SCB content. More specifically, the catalyst composition shows high copolymerizability with respect to 1-hexene in the copolymer of the high molecular weight region by the second metallocene compound, and shows low copolymerizability with respect to 1-hexene in the copolymer in the low molecular weight region by the first metallocene compound. As a result, the catalyst composition has a structure in which the content of 1-hexene comonomer is concentrated at a high molecular weight main chain, i.e., a BOCD (Broad Orthogonal Comonomer Distribution) structure in which the content of side branches increases toward the higher molecular weight region, and at the same time, the catalyst composition may prepare an olefin polymer with excellent processability as well as excellent physical properties due to a broad molecular weight distribution.

Further, the above-described physical property may be easily realized and the improvement effect may be further enhanced by controlling the content ratio of the first and second metallocene compounds in the catalyst composition. Therefore, it is preferable that the content of the second metallocene compound is higher than the content of the first metallocene compound in the catalyst composition of the present invention. Specifically, the first and second metallocene compounds may be included at a molar ratio of 1:1.1 to 1:5, and more specifically, 1:1.1 or more, or 1:1.2 or more, or 1:1.3 or more, and 1:5 or less, or 1:3 or less.

Meanwhile, the catalyst composition may further include a support, and in this case, the first and second metallocene compounds may be used in the state of being supported on the support. When the catalyst composition is used as a supported catalyst, the polymer to be prepared has excellent particle shape and bulk density, and it may be appropriately used in a traditional slurry polymerization, bulk polymerization, or gas-phase polymerization process.

Specific examples of the support include silica, alumina, magnesia, silica-alumina, silica-magnesia, or the like, and commonly, these supports may further include oxides, carbonates, sulfates, and nitrates, such as $Na_2O$, $K_2CO_3$, $BaSO_4$, and $Mg(NO_3)_2$, etc. Among these, when a silica support is used, the transition metal compound is supported by chemically binding with reactive functional groups such as siloxane groups present on the surface of the silica support, and thus the catalyst is hardly released from the support surface in a propylene polymerization process. As a result, when polypropylene is prepared by slurry or gas-phase polymerization, it is possible to minimize a fouling, in which polymer particles stick to the reactor wall or stick to each other.

In addition, the support may be surface-modified through a calcination or drying process in order to increase loading efficiency and to minimize leaching and fouling. Through the surface modification step as described above, moisture on the support surface that inhibits the reaction with the supported component is removed, and the contents of reactive functional groups capable of chemically binding with the supported components, for example, a hydroxyl group and a siloxane group, may be increased.

Specifically, the calcination or drying process for the support may be performed in a range from a temperature, at which moisture disappears from the support surface, to a temperature, at which reactive functional groups, particularly, hydroxyl groups (OH groups) present on the surface completely disappear. Specifically, the temperature may be 150° C. to 600° C., or 200° C. to 500° C. When the temperature at the time of calcination or drying of the support is low, such as lower than 150° C., the moisture removal efficiency is low, and as a result, there is a concern about reduction of the loading efficiency due to reaction of the moisture remaining in the support with a cocatalyst. In contrast, when the drying or calcination temperature exceeds 600° C. and thus is too high, the specific surface area decreases as the pores present on the support surface are combined, and many reactive functional groups such as hydroxyl groups or silanol groups present on the surface disappear. Thus, only siloxane groups remain, and there is a concern about reduction of the reaction sites with the cocatalyst.

When the first and second metallocene compounds are supported on a support, for example, wherein the support is silica, the first and second metallocene compounds may be supported in the total amount of 40 μmol or more, or 80 μmol or more, and 240 μmol or less, or 160 μmol or less, based on 1 g of silica. When they are supported in the above content range, appropriate activity of the supported catalyst may be achieved, and thus it is advantageous in terms of maintaining catalytic activity and economic efficiency.

Further, the catalyst composition may further include a cocatalyst in terms of improving activity and process stability.

The cocatalyst may include one or more selected from a compound represented by the following Chemical Formula 7, a compound represented by the following Chemical Formula 8, and a compound represented by the following Chemical Formula 9:

—[Al($R_{11}$)—O]$_m$—  [Chemical Formula 7]

in Chemical Formula 7, $R_{11}$'s are the same as or different from each other, and each independently, halogen; $C_{1-20}$ hydrocarbon; or halogen-substituted $C_{1-20}$ hydrocarbon; and m is an integer of 2 or more;

J($R_{12}$)$_3$  [Chemical Formula 8]

in Chemical Formula 8, $R_{12}$'s are the same as or different from each other, and each independently, halogen; $C_{1-20}$ hydrocarbon; or halogen-substituted $C_{1-20}$ hydrocarbon; and J is aluminum or boron;

[E-H]$^+$[ZD$_4$]$^-$ or [E]$^+$[ZD$_4$]$^-$  [Chemical Formula 9]

in Chemical Formula 9,

E is a neutral or cationic Lewis base;

H is a hydrogen atom;

Z is an element of Group 13;

D's are the same as or different from each other, and each independently, a $C_{6-20}$ aryl or $C_{1-20}$ alkyl group, of which one or more hydrogen atoms are substituted or unsubstituted with halogen, $C_{1-20}$ hydrocarbon, alkoxy, or phenoxy.

Examples of the compound represented by Chemical Formula 7 may include alkylaluminoxane-based compounds, such as methylaluminoxane, ethylaluminoxane, isobutylaluminoxane, butylaluminoxane, etc., and among them, any one thereof or a mixture of two or more thereof may be used.

Further, examples of the compound represented by Chemical Formula 8 may include trimethylaluminum, triethylaluminum, triisobutylaluminum, tripropylaluminum, tributylaluminum, dimethylchloroaluminum, triisopropylaluminum, tri-s-butylaluminum, tricyclopentylaluminum, tripentylaluminum, triisopentylaluminum, trihexylaluminum, trioctylaluminum, ethyldimethylaluminum, methyldiethylaluminum, triphenylaluminum, tri-p-tolylaluminum, dimethylaluminummethoxide, dimethylaluminumethoxide, trimethylboron, triethylboron, triisobutylboron, tripropylboron, tributylboron, or the like, and among them, any one thereof or a mixture of two or more thereof may be used.

Further, examples of the compound represented by Chemical Formula 9 may include triethylammoniumtetraphenylboron, tributylammoniumtetraphenylboron, trimethylammoniumtetraphenylboron, tripropylammoniumtetraphenylboron, trimethylammoniumtetra(p-tolyl)boron, trimethylammoniumtetra(o,p-dimethylphenyl)boron, tributylammoniumtetra(p-trifluoromethylphenyl)boron, trimethylammoniumtetra(p-trifluoromethylphenyl)boron, tributylammoniumtetrapentafluorophenylboron, N,N-diethylaniliniumtetraphenylboron, N,N-diethylaniliniumtetrapentafluorophenylboron, diethylammoniumtetrapentafluorophenylboron, triphenylphosphoniumtetraphenylboron, trimethylphosphoniumtetraphenylboron, triethylammoniumtetraphenylaluminum, tributylammoniumtetraphenylaluminum, trimethylammoniumtetraphenylaluminum, tripropylammoniumtetraphenylaluminum, trimethylammoniumtetra(p-tolyl)aluminum, tripropylammoniumtetra(p-tolyl)aluminum, triethylammoniumtetra(o,p-dimethylphenyl)aluminum, tributylammoniumtetra(p-trifluoromethylphenyl)aluminum, trimethylammoniumtetra(p-trifluoromethylphenyl)aluminum, tributylammoniumtetrapentafluorophenylaluminum, N,N-diethylaniliniumtetraphenylaluminum, N,N-diethylaniliniumtetrapentafluorophenylaluminum, diethylammoniumtetrapentafluorophenylaluminum, triphenylphosphoniumtetraphenylaluminum, trimethylphosphoniumtetraphenylaluminum, tripropylammoniumtetra(p-tolyl)boron, triethylammoniumtetra(o,p-dimethylphenyl) boron, tributylammoniumtetra(p-trifluoromethylphenyl) boron, triphenylcarboniumtetra(p-trifluoromethylphenyl) boron, triphenylcarboniumtetrapentafluorophenylboron, or the like, and among them, any one thereof or a mixture of two or more thereof may be used.

Among the compounds, the cocatalyst may be more specifically an alkylaluminoxane-based cocatalyst such as methylaluminoxane.

The alkylaluminoxane-based cocatalyst includes metal elements which may stabilize the metallocene compounds, may act as a Lewis acid, and may form a bond through Lewis acid-base interaction with the functional group introduced to the bridge group of the second metallocene compound, thereby further improving the catalytic activity.

Further, the amount of the cocatalyst used may be appropriately adjusted according to the desired physical properties or effects of the catalyst and resin composition. For example, when silica is used as the support, the cocatalyst may be supported in an amount of 8 mmol or more, or 10 mmol or more, and 25 mmol or less, or 20 mmol or less, based on the weight of the support, for example, 1 g of silica.

The catalyst composition having the above composition may be prepared by a preparation method including the step of supporting the cocatalyst compound on the support, and supporting the transition metal compound represented by Chemical Formula 1 on the support, and in this regard, the supporting order of the cocatalyst and the transition metal compound represented by Chemical Formula 1 may be changed as needed. Taking into consideration the effect of the supported catalyst having a structure determined according to the supporting order, the cocatalyst is supported on the support, and then the transition metal compound is supported thereon, which may allow the prepared supported catalyst to realize more excellent process stability together with high catalytic activity in a process of preparing polypropylene.

In addition, the above-described catalyst composition may be used as it is in the polymerization, or may be used in a prepolymerization state through contacting with a propylene monomer, before use in the polymerization. In this case, the preparation method according to an embodiment of the present invention may further include the step of prepolymerizing by contacting the catalyst composition with the propylene monomer before preparing homopolypropylene through a polymerization reaction.

Further, the catalyst composition may be introduced into a polymerization reaction described below after being dissolved or diluted in an aliphatic hydrocarbon solvent having 5 to 12 carbon atoms, for example, pentane, hexane, heptane, nonane, decane, and an isomer thereof, an aromatic hydrocarbon solvent such as toluene and benzene, and a chlorine atom-substituted hydrocarbon solvent such as dichloromethane and chlorobenzene. Here, it is preferable that the solvent is used after eliminating therefrom a small amount of water or air acting as a catalytic poison by treating the solvent with a small quantity of alkylaluminum. It is also possible to perform the polymerization reaction by further using a cocatalyst.

Meanwhile, the polymerization process may be performed by copolymerizing ethylene and 1-hexene in the presence of the above-described catalyst composition.

Specifically, the copolymerization may be performed by a monomodal (or unimodal) polymerization process in which polymerization is performed under a single polymerization reaction condition using a single catalyst in one reactor, and more specifically, performed in the presence of the above-described hybrid supported catalyst described above in one loop-type slurry reactor.

In the traditional multimodal polymerization method, a plurality of reactors are used according to the number of catalysts, and a polymerization reaction is performed by adding each catalyst to each reactor, thereby preparing polymers having different molecular weights, which are then mixed. However, in this case, there is a problem in that uniformity of the polymers decreases due to different molecular weights. In contrast, in the present invention, a polymerization reaction is performed under a single polymerization condition in a single reactor by using the hybrid supported catalyst which is prepared by supporting the two kinds of metallocene compounds on one support, and as a result, a low-molecular-weight polymer and a high-molecular-weight polymer may be polymerized at the same time, leading to preparation of polymers having excellent uniformity.

The polymerization temperature may be 25° C. to 500° C., preferably 25° C. to 200° C., and more preferably 50° C. to 150° C. Further, the polymerization pressure may be 1 Kgf/cm² to 100 Kgf/cm², preferably 1 Kgf/cm² to 50 Kgf/cm², and more preferably 5 Kgf/cm² to 30 Kgf/cm².

The ethylene/1-hexene copolymer prepared by the above-described preparation method may exhibit superior stress cracking resistance due to the broad molecular weight distribution, and superior processability due to the high SCB content in the high molecular weight region. By satisfying the above-described physical properties, the ethylene/1-hexene copolymer according to the present invention may have excellent processability and extrusion property, and excellent stress cracking resistance, and thus it may be preferably applied to high-pressure resistant heating pipes, PE-RT pipes, large-diameter pipes, or the like.

Hereinafter, preferred exemplary embodiments will be provided for better understanding of the present invention. However, the following exemplary embodiments are provided only for understanding the present invention more easily, but the content of the present invention is not limited thereby.

Synthesis Example 1: Preparation of First Metallocene Compound (1)

t-Butyl-O—(CH₂)₆—Cl was prepared using 6-chlorohexanol according to a method described in a literature (Tetrahedron Lett. 2951 (1988)), and then reacted with NaCp to obtain t-Butyl-O—(CH₂)₆—C₅H₅ (yield 60%, b.p. 80° C./0.1 mmHg).

Further, t-butyl-O—(CH₂)₆—C₅H₅ was dissolved in THF at −78° C., and normal butyllithium (n-BuLi) was slowly added, and then heated to room temperature, and allowed to react for 8 hr. The synthesized lithium salt solution was slowly added to a suspension of ZrCl₄(THF)₂ (1.70 g, 4.50 mmol)/THF (30 ml) at −78° C., and the solution was additionally reacted at room temperature for 6 hr.

All volatile materials were dried under vacuum, and a hexane solvent was added to the obtained oily liquid to filter. The filtered solution was dried under vacuum, and then hexane was added to induce precipitation at a low temperature (−20° C.). The obtained precipitate was filtered at a low temperature to obtain a white solid [tBu—O—(CH₂)₆—C₅H₄]₂ZrCl₂ compound (1) (yield 92%).

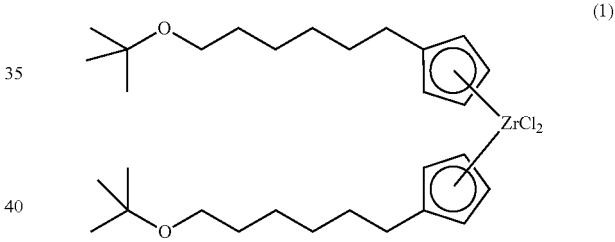

(1)

¹H NMR (300 MHz, CDCl₃): 6.28 (t, J=2.6 Hz, 2H), 6.19 (t, J=2.6 Hz, 2H), 3.31 (t, 6.6 Hz, 2H), 2.62 (t, J=8 Hz), 1.7-1.3 (m, 8H), 1.17 (s, 9H).

¹³C NMR (CDCl₃): 135.09, 116.66, 112.28, 72.42, 61.52, 30.66, 30.61, 30.14, 29.18, 27.58, 26.00.

Synthesis Example 2: Preparation of Second Metallocene Compound (2)

(1) Preparation of Ligand A 4.0 g (30 mmol) of 1-benzothiophene was dissolved in THF to prepare a 1-benzothiophene solution. 14 mL of n-BuLi solution (36 mmol, 2.5 M in hexane) and 1.3 g (15 mmol) of CuCN were added to the 1-benzothiophene solution.

Subsequently, 3.6 g (30 mmol) of tigloyl chloride was slowly added to the solution at −80° C., and the obtained solution was stirred at room temperature for about 10 hr.

Thereafter, 10% HCl was poured into the solution to quench the reaction, and an organic layer was separated using dichloromethane to form a beige solid (2E)-1-(1-benzothien-2-yl)-2-methyl-2-buten-1-one.

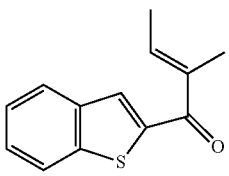

¹H NMR (CDCl₃): 7.85-7.82 (m, 2H), 7.75 (m, 1H), 7.44-7.34 (m, 2H), 6.68 (m, 1H), 1.99 (m, 3H), 1.92 (m, 3H)

5.0 g (22 mmol) of the prepared (2E)-1-(1-benzothien-2-yl)-2-methyl-2-buten-1-one was dissolved in 5 mL of chlorobenzene, and 34 mL of sulfuric acid was slowly added to the solution under vigorous stirring. Further, the solution was stirred at room temperature for about 1 hr. Thereafter, ice water was poured into the solution, and an organic layer was separated using an ether solvent to obtain 4.5 g (91% yield) of a yellow solid 1,2-dimethyl-1,2-dihydro-3H-benzo[b]cyclopenta[d]thiophen-3-one.

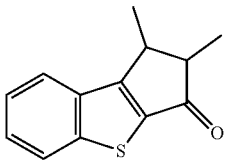

¹H NMR (CDCl₃): 7.95-7.91 (m, 2H), 7.51-7.45 (m, 2H), 3.20 (m, 1H), 2.63 (m, 1H), 1.59 (d, 3H), 1.39 (d, 3H)

570 mg (15 mmol) of NaBH₄ was added at 0° C. to 2.0 g (9.2 mmol) of 1,2-dimethyl-1,2-dihydro-3H-benzo[b]cyclopenta[d]thiophen-3-one dissolved in a mixed solvent of 20 mL of THF and 10 mL of methanol. Then, the solution was stirred at room temperature for about 2 hr. Thereafter, HCl was added to the solution to adjust pH at 1, and an organic layer was separated using an ether solvent to obtain an alcohol intermediate.

The alcohol intermediate was dissolved in toluene to prepare a solution. To the solution, 190 mg (1.0 mmol) of p-toluenesulfonic acid was added and refluxed for about 10 min. The obtained reaction mixture was separated by column chromatography to obtain 1.8 g (9.0 mmol, 98% yield) of 1,2-dimethyl-3H-benzo[b]cyclopenta[d]thiophene (ligand A) which was an orange-brown colored liquid.

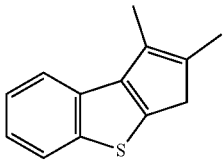

¹H NMR (CDCl₃): 7.81 (d, 1H), 7.70 (d, 1H), 7.33 (t, 1H), 7.19 (t, 1H), 6.46 (s, 1H), 3.35 (q, 1H), 2.14 (s, 3H), 1.14 (d, 3H)

(2) Preparation of Ligand B 13 mL (120 mmol) of t-butylamine and 20 mL of an ether solvent were put in a 250 mL schlenk flask, and 16 g (60 mmol) of (6-tert-butoxyhexyl)dichloro(methyl)silane and 40 mL of an ether solvent were put in another 250 mL schlenk flask to prepare a t-butylamine solution and a (6-tert-butoxyhexyl)dichloro(methyl)silane solution, respectively. Further, the t-butylamine solution was cooled at −78° C., and then the (6-tert-butoxyhexyl)dichloro(methyl)silane solution was slowly added to the cooled solution, and stirred at room temperature for about 2 hr. The produced white suspension was filtered to obtain an ivory colored liquid 1-(6-(tert-butoxy)hexyl)-N-(tert-butyl)-1-chloro-1-methyl silaneamine (ligand B).

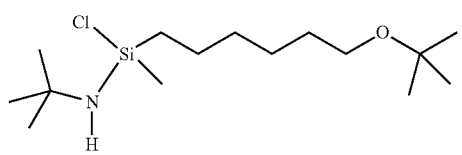 [SMILES: CC(C)(C)N[Si](C)(Cl)CCCCCCOC(C)(C)C]

¹H NMR (CDCl₃): 3.29 (t, 2H), 1.52-1.29 (m, 10H), 1.20 (s, 9H), 1.16 (s, 9H), 0.40 (s, 3H)

(3) Crosslinking of Ligands A and B 1.7 g (8.6 mmol) of 1,2-dimethyl-3H-benzo[b]cyclopenta[d]thiophene (ligand A) was put in a 250 mL schlenk flask, and 30 mL of THF was added thereto to prepare a ligand A solution. The ligand A solution was cooled at −78° C., and then 3.6 mL (9.1 mmol, 2.5 M in hexane) of n-BuLi solution was added to the ligand A solution, and stirred at room temperature overnight to obtain a purple-brown solution. The solvent of the purple-brown solution was replaced by toluene, and to this solution, a solution, in which 39 mg (0.43 mmol) of CuCN was dispersed in 2 mL of THF, was added to prepare a solution A.

Meanwhile, 1-(6-(tert-butoxy)hexyl)-N-(tert-butyl)-1-chloro-1-methylsilaneamine (ligand B) and toluene were put in a 250 mL schlenk flask, and the prepared solution B was cooled at −78° C. The solution A previously prepared was slowly added to the cooled solution B. A mixture of the solutions A and B was stirred at room temperature overnight. The produced solid was filtered and removed to obtain 4.2 g (>99% yield) of a brown-colored viscous liquid 1-(6-(tert-butoxy)hexyl)-N-(tert-butyl)-1-(1,2-dimethyl-3H-benzo[b]cyclopenta[d]thiophen-3-yl)-1-methylsilaneamine (a crosslinked product of ligands A and B).

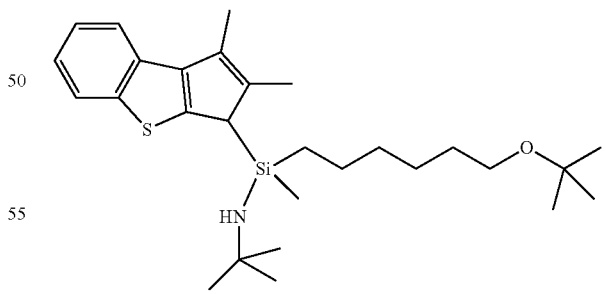

To identify the structure of the crosslinked product of ligands A and B, the crosslinked product was subjected to lithiation at room temperature, and then a sample dissolved in a small amount of pyridine-D5 and CDCl₃ was used to obtain H-NMR spectrum.

¹H NMR (pyridine-D5 and CDCl₃): 7.81 (d, 1H), 7.67 (d, 1H), 7.82-7.08 (m, 2H), 3.59 (t, 2H), 3.15 (s, 6H), 2.23-1.73 (m, 10H), 2.15 (s, 9H), 1.91 (s, 9H), 1.68 (s, 3H)

(4) Preparation of Transition Metal Compound 4.2 g (8.6 mmol) of 1-(6-(tert-butoxy)hexyl)-N-(tert-butyl)-1-(1,2-dimethyl-3H-benzo[b]cyclopenta[d]thiophen-3-yl)-1-methylsilaneamine (the crosslinked product of ligands A and B) was put in a 250 mL schlenk flask, and then 14 mL of toluene and 1.7 mL of n-hexane were injected to the flask to dissolve the crosslinked product therein. This solution was cooled at −78° C., and then 7.3 mL (18 mmol, 2.5 M in hexane) of n-BuLi solution was injected to the cooled solution. The solution was stirred at room temperature for about 12 hr. Subsequently, 5.3 mL (38 mmol) of trimethylamine was injected to the solution, and then this solution was stirred at about 40° C. for about 3 hr to prepare a solution C.

Meanwhile, to a 250 mL schlenk flask separately prepared, 2.3 g (8.6 mmol) of TiCl$_4$(THF)$_2$ and 10 mL of toluene were added to prepare a solution D, in which TiCl$_4$(THF)$_2$ was dispersed in toluene. The solution C previously prepared was slowly added to the solution D at −78° C. A mixture of the solutions C and D was stirred at room temperature for about 12 hr. Thereafter, the solvent was removed from the solution under reduced pressure, and the obtained solute was dissolved in toluene. Solids which were not dissolved in toluene were filtered and removed. The solvent was removed from the filtered solution to obtain 4.2 g (83% yield) of a brown-colored solid transition metal compound (2).

(2)

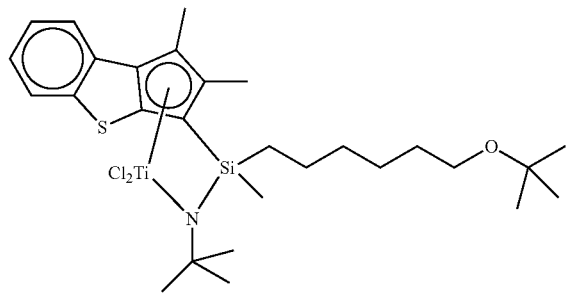

$^1$H NMR (CDCl$_3$): 8.01 (d, 1H), 7.73 (d, 1H), 7.45-7.40 (m, 2H), 3.33 (t, 2H), 2.71 (s, 3H), 2.33 (d, 3H), 1.38 (s, 9H), 1.18 (s, 9H), 1.80-0.79 (m, 10H), 0.79 (d, 3H)

Preparation Example 1: Preparation of Hybrid Supported Catalyst (A)

3.0 kg of a toluene solution was put in a 20 L sus high pressure reactor, and the reactor temperature was maintained at 40° C. 500 g of silica (Grace Davison, SP2212) dehydrated under vacuum at 600° C. for 12 hr was introduced into the reactor, and sufficiently dispersed. Then, 2.78 kg of 10 wt % methylaluminoxane (MAO)/toluene solution was introduced, followed by stirring at 80° C. and 200 rpm for 15 hr or more.

The reactor temperature was reduced to 40° C., and then 200 g of the first metallocene compound prepared in Synthesis Example 1/toluene solution (7.8 wt % in toluene) was introduced into the reactor, followed by stirring at 200 rpm for 1 hr. Subsequently, 250 g of the second metallocene compound (b) prepared in Synthesis Example 2/toluene solution (7.8 wt % in toluene) was introduced into the reactor, followed by stirring at 200 rpm for 1 hr (a molar ratio of the first metallocene compound and the second metallocene compound=1:1.3).

70 g of a cocatalyst (anilinium tetrakis(pentafluorophenyl)borate) was diluted in toluene, and the solution was introduced into the reactor, followed by stirring at 200 rpm for 15 hr or more. The reactor temperature was reduced to room temperature, and then stirring was stopped, followed by settling for 30 min. Then, the reaction solution was subjected to decantation.

The toluene slurry was transferred to a filter dryer, and filtered. 3.0 kg of toluene was injected and stirred for 10 min, and then stirring was stopped and filtration was performed. 3.0 kg of hexane was injected to the reactor, followed by stirring for 10 min. Then, stirring was stopped, and filtration was performed. Drying was performed under reduced pressure at 50° C. for 4 hr to prepare 500 g of a SiO$_2$-supported catalyst.

Preparation Example 2: Preparation of Hybrid Supported Catalyst (B)

A hybrid supported catalyst was prepared in the same manner as in Preparation Example 1, except that (methyl (6-t-butoxyhexyl)silyl(η5-tetramethylCp)(t-Butylamido)) TiCl$_2$ was used as the second metallocene compound.

Preparation Example 3: Preparation of Hybrid Supported Catalyst (C)

A hybrid supported catalyst was prepared in the same manner as in Preparation Example 1, except that 3-(6-(tert-butoxy)hexyl)-1H-inden-1-yl)(3-butylcyclopenta-2,4-dien-1-yl) zirconium(IV) dichloride having the following structure was used as the first metallocene compound.

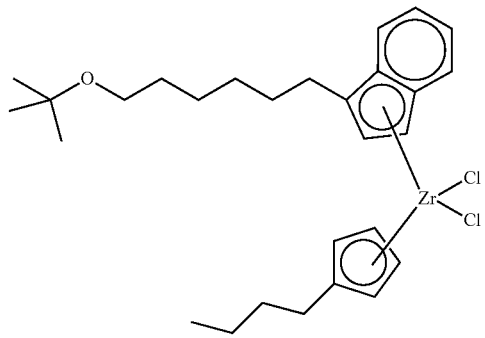

Example 1

An ethylene/1-hexene copolymer was prepared by a monomodal polymerization process.

Specifically, an ethylene/1-hexene(1-C6) copolymer was prepared under the conditions described in Table 1 below using the hybrid supported metallocene catalyst (A) prepared in Preparation Example 1, and a hexane slurry stirred tank reactor through a polymerization reaction in one loop-type reactor.

Example 2

An ethylene/1-hexene copolymer was prepared in the same manner as in Example 1, except that the reaction was performed under the conditions described in Table 1 below.

Comparative Example 1

XRT-70™ (available from Total) prepared by using a Ziegler Natta (Z/N) catalyst and two reactors through a Bi-modal type polymerization process was used.

Comparative Example 2

HOSTALEN 4731B™ (available from Basell) prepared by using a Ziegler Natta (Z/N) catalyst and three reactors through a tri-modal type polymerization process was used.

Comparative Example 3

SP700™ (available from LG CHEM) prepared by using a metallocene catalyst and two reactors through a bi-modal type polymerization process was used.

Comparative Example 4

An ethylene/1-hexene copolymer was prepared in the same manner as in Example 1, except that the hybrid supported catalyst (B) prepared in Preparation Example 2 was used, and reaction was performed under the conditions described in Table 1 below.

Comparative Example 5

An ethylene/1-hexene copolymer was prepared in the same manner as in Example 1, except that the hybrid supported catalyst (C) prepared in Preparation Example 3 was used, and reaction was performed under the conditions described in Table 1 below.

Comparative Example 6

An ethylene/1-hexene copolymer was prepared in the same manner as in Example 1, except that reaction was performed under the conditions described in Table 1 below without introducing hydrogen gas.

Experimental Example 1

Physical properties of the ethylene/1-hexene copolymers prepared or used in Examples and Comparative Examples were measured by the following method, and the results are shown in Table 2.

1) Density: measured according to ASTM 1505.
2) Melt Index ($MI_{2.16}$): measured according to ASTM D1238 (condition E, 190° C., under a load of 2.16 kg) standard.
3) High load melt index (HLMI; $MI_{21.6}$): measured according to ASTM D1238 (condition E, 190° C., under a load of 21.6 kg) standard.
4) MFRR ($MFR_{21.6}/MFR_{2.16}$): a ratio obtained by dividing $MFR_{21.6}$ melt index (MI, under a load of 21.6 kg) by $MFR_{2.16}$ (MI, under a load of 2.16 kg).
5) Molecular weight distribution (PDI, polydispersity index) and GPC curve:

A weight average molecular weight (Mw) and a number average molecular weight (Mn) of each polymer were measured by gel permeation chromatography (GPC, manufactured by Waters), and a molecular weight distribution (PDI) was determined by dividing the weight average molecular weight by the number average molecular weight.

Specifically, the ethylene/1-hexene copolymer sample was evaluated by using a PLgel MIX-B column (Polymer Laboratories) having a length of 300 mm and Waters PL-GPC220 instrument. The evaluation was performed at a temperature of 160° C. by using 1,2,4-trichlorobenzene as a solvent at a flow rate of 1 mL/min. The sample was prepared at a concentration of 10 mg/10 mL, and then 200 μL thereof was applied. The values of Mw and Mn were determined using a calibration curve created using polystyrene standards. 9 kinds of polystyrene standards having a molecular weight (g/mol) of 2,000/10,000/30,000/70,000/200,000/700,000/2,000,000/4,000,000/10,000,000 were used.

6) FNCT (Full Notch Creep Test):

FNCT was measured according to ISO 16770 which is described in a literature [M. Fleissner in Kunststoffe 77 (1987), pp. 45 et seq.] and is currently used.

TABLE 1

| | Ex. 1 | Ex. 2 | Comp. Ex. 4 | Comp. Ex. 5 | Comp. Ex. 6 |
|---|---|---|---|---|---|
| Kind and input amount of metallocene catalyst (cc/hr) | Preparation Example 1(A) (150) | Preparation Example 1(A) (143) | Preparation Example 2(B) (170) | Preparation Example 3(C) (153) | Preparation Example 1(A) (147) |
| Supply of ethylene (kg/hr) | 10.0 | 10.0 | 10.0 | 10.0 | 10.0 |
| Kind and input amount of comonomer (ml/min) | 1-C6 (7.0) | 1-C6 (7.1) | 1-C6 (5.9) | 1-C6 (6.3) | 1-C6 (14.3) |
| Input amount of hydrogen (g/hr) | 1.73 | 1.42 | 1.74 | 1.37 | 0.00 |
| Polymerization temperature (° C.) | 93 | 93 | 93 | 93 | 93 |
| Polymerization pressure (Kgf/cm²) | 7.7 | 7.7 | 7.6 | 7.7 | 7.7 |
| Catalytic activity* (kgPE/g Cat · hr) | 9.9 | 10.3 | 8.7 | 9.6 | 10.0 |

*Catalytic activity (kgPE/gCat · hr): the weights of the catalysts used in the polymerization reactions of Examples or Comparative Examples and the weights of the polymers prepared from the polymerization reactions were measured, respectively, and a ratio of the weight of the prepared polymer to the weight of the used catalyst was determined as the catalytic activity.

At 10% concentration of IGEPAL CO-630 (Etoxilated Nonylphenol, Branched) which is a stress crack accelerating medium and a tension of 4.0 MPa at 80° C., due to the shortening of stress initiation time by notch (1.5 mm/safety razor blade), damage time was shortened. The test specimens were manufactured by sawing three test specimens having a width of 10 mm, a height of 10 mm, and a length of 100 mm from compression-molded sheet of 10 mm thickness. The notch depth was 1.5 mm. The time taken until the specimen was cut was measured.

7) BOCD Index and SCB Content:

The BOCD index was calculated based on the following Equation 1 by obtaining a molecular weight distribution curve by plotting a log value (log M) of a weight average molecular weight (M) on the x-axis, and a molecular weight distribution (dwt/dlog M) with respect to the log value on the y-axis, and then measuring the SCB (Short Chain Branch) content (content of branches having 2 to 7 carbon atoms per 1,000 carbons, unit: branch/1,000 C) at the left and right borders of centered 60% area excluding 20% of the left and right ends in the total area.

In this regard, the SCB content at a high molecular weight region and the SCB content at a low molecular weight region mean SCB content values at the left and right borders of centered 60% area, respectively. The sample was pretreated by dissolving in 1,2,4-trichlorobenzene containing 0.0125% BHT using PL-SP260 at 160° C. for 10 hours, and measured at 160° C. using PerkinElmer Spectrum 100 FT-IR connected to a high-temperature GPC (PL-GPC220).

BOCD Index=(SCB content at high molecular weight region−SCB content at low molecular weight region)/(SCB content at low molecular weight region)   [Equation 1]

8) Shear Viscosity ($\eta_{1000}$):

Shear viscosity was measured using a capillary rheometer at 210° C. and a shear rate of 1/1000 sec.

Specifically, viscosity was measured using a RHEO-TESTER 2000 of Gottfert with a die size[L/D] of 10/2 (a length of die (L)=10 mm, a diameter of die (D)=2 mm) at a temperature of 210° C. and a shear rate of 1/1000 sec.

9) Strain Hardening Modulus (S.H.)

In order to evaluate resistance of polyethylene against slow crack growth, strain hardening modulus was measured for each polyethylene of Examples and Comparative Examples according to ISO 18488 (2015(E)) (thickness of specimen=0.3 mm).

The results are shown in Table 2 below. Further, GPC curves of the copolymers prepared in Examples 1 and 2 and Comparative Examples 1 to 6 are shown in FIGS. 1 to 8, and a graph showing changes in the shear viscosity according to the shear rate of the copolymers prepared in Examples 1 and 2 and Comparative Examples 1 to 6 is shown in FIG. 9.

TABLE 2

| | Kind of comonomer | Density (g/cm³) | MI$_{2.16}$ (g/10 min) | HLMI (g/10 min) | MFRR | PDI | Mw (g/mol) k = 10³ | FNCT (time) | BOCD index | $\eta_{1000}$ (Pa · s) | S.H. (MPa) |
|---|---|---|---|---|---|---|---|---|---|---|---|
| Ex.1 | 1-C6 | 0.945 | 0.21 | 16.9 | 104 | 12.7 | 210 k | 2000 | 4.4 | 340 | 21.8 |
| Ex.2 | 1-C6 | 0.946 | 0.13 | 24.5 | 100 | 14.7 | 235 k | 2300 | 3.8 | 380 | 22.2 |
| Comp. Ex.1 | 1-C6 | 0.947 | 0.18 | 18.6 | 103 | 17.0 | 200 k | 2000 | 3.4 | 415 | 21.5 |
| Comp. Ex.2 | 1-C4 | 0.948 | 0.12 | 9.6 | 83 | 18.5 | 210 k | 800 | 2.5 | 430 | 21.0 |
| Comp. Ex.3 | 1-C4 | 0.943 | 0.064 | 7.6 | 120 | 21.2 | 270 k | 1200 | 1.7 | 430 | 21.1 |
| Comp. Ex.4 | 1-C6 | 0.947 | 0.20 | 14.0 | 70 | 10.8 | 160 | 100 | 1.1 | 465 | 20.1 |
| Comp. Ex.5 | 1-C4 | 0.945 | 0.17 | 13.9 | 82 | 10.4 | 170 k | 400 | 0.9 | 445 | 20.4 |
| Comp. Ex.6 | 1-C6 | 0.942 | 0.021 | 1.37 | 65 | 7.2 | 295 k | >3000 | 2.6 | 525 | 22.5 |

As a result of the experiments, the ethylene/1-hexene copolymers of Examples 1 and 2 showed a high BOCD index and low shear viscosity together with a broad molecular weight distribution, as compared with those of Comparative Examples, suggesting that they exhibit excellent long-term physical properties and processability.

The invention claimed is:

1. An ethylene/1-hexene copolymer satisfying the following (a1) to (a5) conditions:
   (a1) a shear viscosity, as measured at 210° C. and a shear rate of 1/1000 sec using a capillary rheometer: 300 Pa·s to 400 Pa·s,
   (a2) a melt flow rate ratio of MFR$_{21.6}$/MFR$_{2.16}$, as measured at 190° C. according to ASTM D1238: 90 or more and less than 120,
   (a3) a broad orthogonal co-monomer distribution (BOCD) index according to the following Equation 1: 3.5 to 5,
   (a4) a molecular weight distribution: 12 to 15, and
   (a5) a bimodal molecular weight distribution, BOCD Index=(SCB content at high molecular weight region−SCB content at low molecular weight region)/(SCB content at low molecular weight region)   [Equation 1]

in Equation 1, the SCB content at a high molecular weight region and the SCB content at a low molecular weight region represent short chain branch contents at left and right borders of centered 60% area excluding 20% of left and right ends in a total area, respectively, when a molecular weight distribution curve is obtained by plotting a log value of a weight average molecular weight on an x-axis, and a molecular weight distribution with respect to the log value on a y-axis.

2. The ethylene/1-hexene copolymer of claim 1, further satisfying one or more of the following (a1') to (a4') conditions:
   (a1') a shear viscosity, as measured at 210° C. and a shear rate of 1/1000 sec using a capillary rheometer: 320 Pa·s to 390 Pa·s,
   (a2') a melt flow rate ratio of MFR$_{21.6}$/MFR$_{2.16}$, as measured at 190° C. according to ASTM D1238: 95 to 110, (a3') a BOCD index according to the Equation 1: 3.6 to 4.8, and (a4') a molecular weight distribution: 12.5 to 14.8.

3. The ethylene/1-hexene copolymer of claim 1, which has a density of 0.94 g/cm³ to 0.95 g/cm³, as measured according to ASTM 1505.

4. The ethylene/1-hexene copolymer of claim 1, which has a melt index of 0.1 g/10 min to 0.5 g/10 min, as measured at 190° C. under a load of 2.16 kg according to ASTM D1238.

5. The ethylene/1-hexene copolymer of claim 1, which has a high load melt index of 15 g/10 min to 30 g/10 min, as measured at 190° ° C. under a load of 21.6 kg according to ASTM D1238.

6. The ethylene/1-hexene copolymer of claim 1, which has a weight average molecular weight of 10,000 g/mol to 400,000 g/mol.

7. The ethylene/1-hexene copolymer of claim 1, which has a stress cracking resistance of 2,000 hr to 20,000 hr, as measured by a full notch creep test under conditions of 4.0 MPa and 80° C. according to ISO 16770.

8. The ethylene/1-hexene copolymer of claim 1, wherein a content of 1-hexene in the ethylene/1-hexene copolymer is 5% by weight to 10% by weight, based on a total weight of the ethylene/1-hexene copolymer.

9. A method of preparing the ethylene/1-hexene copolymer of claim 1, the method comprising a step of copolymerizing ethylene and 1-hexene while introducing hydrogen gas in the presence of a catalyst composition comprising a first metallocene compound represented by the following Chemical Formula 1 and a second metallocene compound represented by the following Chemical Formula 2 in a single reactor:

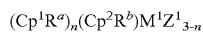  [Chemical Formula 1]

in Chemical Formula 1, $M^1$ is a transition metal of Group 4;

$Cp^1$ and $Cp^2$ are each cyclopentadienyl, which is unsubstituted or substituted with $C_{1-20}$ hydrocarbon;

$R^a$ and $R^b$ are the same as or different from each other, and each independently hydrogen, $C_{1-20}$ alkyl, $C_{1-20}$ alkoxy, $C_{2-20}$ alkoxyalkyl, $C_{6-20}$ aryl, $C_{6-20}$ aryloxy, $C_{2-20}$ alkenyl, $C_{7-40}$ alkylaryl, $C_{7-40}$ arylalkyl, $C_{8-40}$ arylalkenyl, $C_{2-20}$ alkynyl, or $C_{2-20}$ heteroaryl including one or more heteroatoms selected from the group consisting of N, O, and S;

$Z^1$ is halogen, $C_{1-20}$ alkyl, $C_{2-20}$ alkenyl, $C_{7-40}$ alkylaryl, $C_{7-40}$ arylalkyl, $C_{6-20}$ aryl, a substituted or unsubstituted amino group, $C_{2-20}$ alkylalkoxy, or $C_{7-40}$ arylalkoxy; and n is 1 or 0;

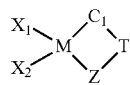  [Chemical Formula 2]

in Chemical Formula 2, $C_1$ is any one of ligands represented by the following Chemical Formulae 3 to 6,

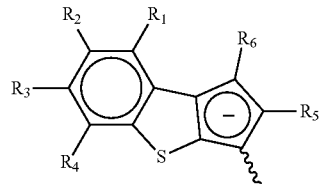

[Chemical Formula 3]

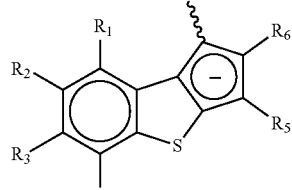

[Chemical Formula 4]

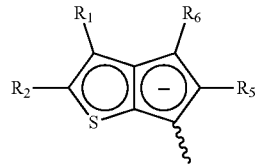

[Chemical Formula 5]

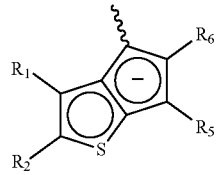

[Chemical Formula 6]

in Chemical Formulae 3 to 6, $R_1$ to $R_6$ are the same as or different from each other, and each independently, hydrogen, $C_{1-30}$ alkyl, $C_{1-30}$ alkoxy, $C_{2-30}$ alkoxyalkyl, $C_{6-30}$ aryl, $C_{6-30}$ aryloxy, $C_{2-30}$ alkenyl, $C_{2-30}$ alkynyl, $C_{3-30}$ cycloalkyl, $C_{7-40}$ alkylaryl, $C_{8-40}$ alkenylaryl, $C_{8-40}$ alkynylaryl, $C_{7-40}$ arylalkyl, $C_{8-40}$ arylalkenyl, or $C_{8-40}$ arylalkynyl, M is Ti, Zr, or Hf, Z is —O—, —S—, —NR$_7$— or —PR$_7$—, $R_7$ is hydrogen, $C_{1-30}$ alkyl, $C_{6-30}$ aryl, $C_{2-30}$ alkenyl, $C_{2-30}$ alkynyl, $C_{3-30}$ cycloalkyl, $C_{7-40}$ alkylaryl, $C_{8-40}$ alkenylaryl, $C_{8-40}$ alkynylaryl, $C_{7-40}$ arylalkyl, $C_{8-40}$ arylalkenyl, $C_{8-40}$ arylalkynyl, $C_{1-30}$ alkoxysilyl, $C_{6-30}$ aryloxysilyl, $C_{1-30}$ alkylsilyl, or $C_{1-30}$ silylalkyl, $X_1$ and $X_2$ are the same as or different from each other, and each independently, halogen, $C_{1-30}$ alkyl, $C_{2-30}$ alkenyl, $C_{7-30}$ alkylaryl, $C_{7-30}$ arylalkyl, $C_{6-20}$ aryl, a substituted or unsubstituted amino group, $C_{2-30}$ alkylalkoxy, or $C_{7-30}$ arylalkoxy, T is

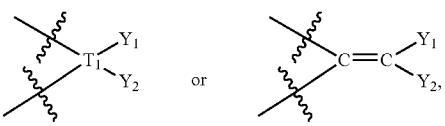

$T_1$ is C, Si, Ge, Sn, or Pb, $Y_1$ is hydrogen, $C_{1-30}$ alkyl, $C_{1-30}$ alkoxy, $C_{2-30}$ alkoxyalkyl, $C_{6-30}$ aryl, $C_{6-30}$ aryloxy, $C_{7-30}$ aryloxyalkyl, $C_{2-30}$ alkenyl, $C_{2-30}$ alkynyl, $C_{3-30}$ cycloalkyl, $C_{7-40}$ alkylaryl, $C_{8-40}$ alkenylaryl, $C_{8-40}$ alkynylaryl, $C_{7-40}$ arylalkyl, C$_{8-40}$ arylalkenyl, or C$_{8-40}$ arylalkynyl, silyl (—SiH$_3$), C$_{1-30}$ alkoxysilyl, C$_{2-30}$ alkoxyalkylsilyl, C$_{6-30}$ aryloxysilyl, C$_{1-30}$ haloalkyl, C$_{6-30}$ haloaryl, or —NR$_9$R$_{10}$, Y$_2$ is C$_{2-30}$ alkoxyalkyl, or C$_{7-40}$ aryloxyalkyl, and R$_9$ and R$_{10}$ are each independently hydrogen, C$_{1-30}$ alkyl, C$_{6-30}$ aryl, C$_{2-30}$ alkenyl, C$_{2-30}$ alkynyl, C$_{3-30}$ cycloalkyl, C$_{7-40}$ alkylaryl, C$_{8-40}$ alkenylaryl, C$_{8-40}$ alkynylaryl, C$_{7-40}$ arylalkyl, C$_{8-40}$ arylalkenyl, or C$_{8-40}$ arylalkynyl, or connected to each other to form an aliphatic or aromatic ring.

10. The method of claim 9, wherein in Chemical Formula 1, R$^a$ and R$^b$ are each independently hydrogen, C$_{1-10}$ alkyl, C$_{2-10}$ alkoxyalkyl, or C$_{7-20}$ arylalkyl, and at least one of R$^a$ or R$^b$ is —(CH$_2$)n-OR, wherein R is a linear or branched alkyl group having 1 to 6 carbon atoms, and n is an integer of 2 to 4).

11. The method of claim 9, wherein the first metallocene compound is any one selected from the group consisting of the following compounds:

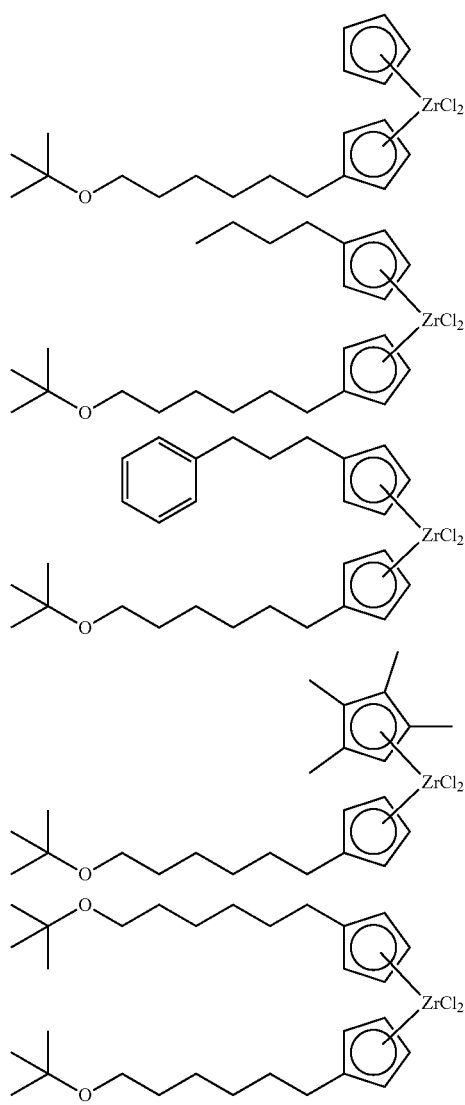

12. The method of claim 9, wherein the second metallocene compound is any one of compounds represented by the following Chemical Formulae 2a to 2d:

[Chemical Formula 2a]

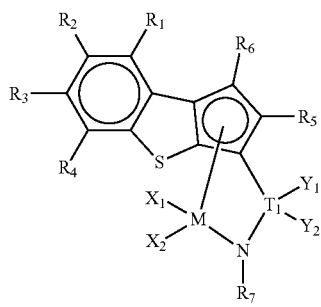

[Chemical Formula 2b]

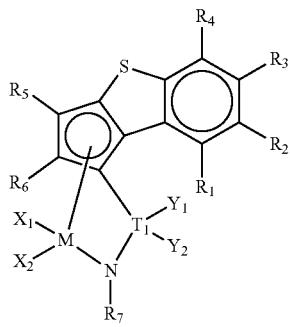

[Chemical Formula 2c]

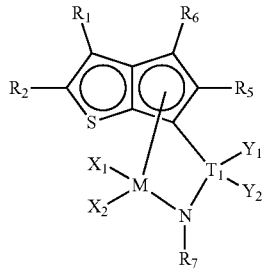

[Chemical Formula 2d]

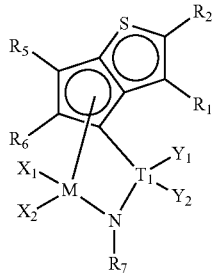

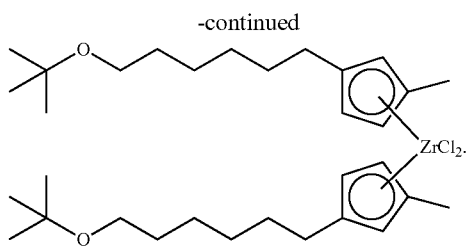

in Chemical Formulae 2a to 2d,

M is Ti, Zr, or Hf, $R_1$ to $R_4$ are each independently hydrogen or $C_{1-20}$ alkyl, $R_5$ and $R_6$ are each independently $C_{1-10}$ alkyl, $R_7$ is $C_{1-10}$ alkyl, $T_1$ is C or Si, $Y_1$ is $C_{1-20}$ alkyl, $C_{1-20}$ alkoxy, $C_{2-20}$ alkoxyalkyl, $C_{6-20}$ aryl, $C_{7-30}$ alkylaryl, $C_{7-30}$ arylalkyl, $C_{6-20}$ aryloxy, or $C_{7-30}$ aryloxyalkyl, $Y_2$ is $C_{2-20}$ alkoxyalkyl or $C_{7-30}$ aryloxyalkyl, and $X_1$ and $X_2$ are each independently halogen or $C_{1-20}$ alkyl.

13. The method of claim 9, wherein the second metallocene compound is any one selected from the group consisting of the following compounds:

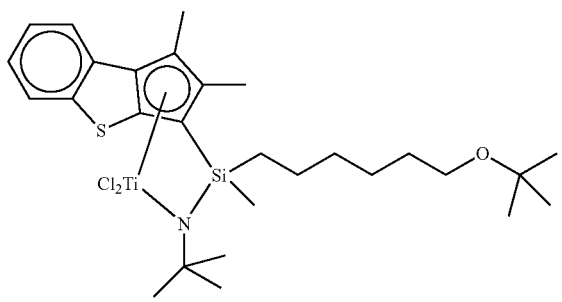

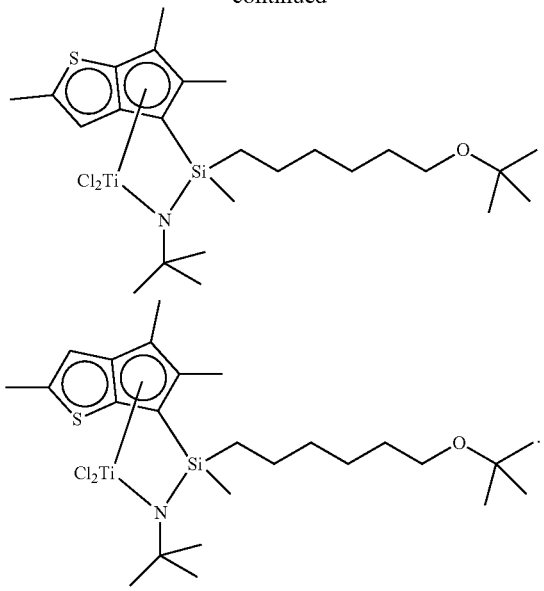

14. The method of claim 9, wherein the first and second metallocene compounds are comprised at a molar ratio of 1:1.1 to 1:5.

15. The method of claim 9, wherein copolymerization is performed in one loop-type slurry reactor.

16. The method of claim 9, wherein the 1-hexene is comprised in an amount of 5% by weight to 10% by weight, based on a total weight of monomer.

17. A pipe comprising the ethylene/1-hexene copolymer of claim 1.

* * * * *